United States Patent
Frota de Souza et al.

(10) Patent No.: US 9,643,262 B2
(45) Date of Patent: May 9, 2017

(54) COUPLING MECHANISM FOR CUTTING TOOL

(71) Applicant: Kennametal Inc., Latrobe, PA (US)

(72) Inventors: Ruy Frota de Souza, Latrobe, PA (US); Leonid B. Sharivker, Naharia (IL); Sergei Boulakhov, Naharia (IL); Christoph Gey, Zimdorf (DE); Yosi Harush, Kiryat Mozkin (IL); Alan Bookheimer, Greensburg, PA (US); Uzi Levy, Kibbutz Matzuva (IL); Stephen M. George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 199 days.

(21) Appl. No.: 14/273,456

(22) Filed: May 8, 2014

(65) Prior Publication Data
US 2015/0030399 A1  Jan. 29, 2015

Related U.S. Application Data

(63) Continuation-in-part of application No. 13/950,407, filed on Jul. 25, 2013.

(51) Int. Cl.
*B23B 31/11* (2006.01)
*B23C 5/10* (2006.01)
(Continued)

(52) U.S. Cl.
CPC ............... *B23C 5/10* (2013.01); *B23B 31/11* (2013.01); *B23B 51/00* (2013.01);
(Continued)

(58) Field of Classification Search
CPC ....... Y10T 408/9098; Y10T 408/90993; Y10T 408/94; Y10T 408/95; Y10T 408/957;
(Continued)

(56) References Cited

U.S. PATENT DOCUMENTS

| 756,339 A | 4/1904 | Down |
|---|---|---|
| 1,083,747 A | 1/1914 | Kocher |

(Continued)

FOREIGN PATENT DOCUMENTS

| CH | 238003 A | 6/1945 |
|---|---|---|
| CH | 238003 A | 9/1945 |

(Continued)

OTHER PUBLICATIONS

Jun. 29, 2015 First office action.

(Continued)

*Primary Examiner* — Daniel Howell
*Assistant Examiner* — Nicole N Ramos
(74) *Attorney, Agent, or Firm* — Ian K. Samways

(57) ABSTRACT

A rotary cutting tool including a cutter member having an axial forward end and an axial rearward end. A cutting region is at the axial forward end of the cutter member, and a male threaded portion is adjacent the axial rearward end of the cutter member. A shank member has an axial forward end and a shank bore opening at the axial forward end. The shank bore has an axial shank bore length. The shank bore contains a female threaded portion and an axial rearward shank bore portion axially rearward of the female threaded portion. The axial rearward shank bore portion has a terminal end. When the male threaded portion of the cutter member fully engages the female threaded portion of the shank member, the axial rearward end of the cutter member being spaced a first distance axially forward of the terminal end of the axial rearward shank bore portion.

20 Claims, 17 Drawing Sheets

(51) Int. Cl.
*F16B 39/30* (2006.01)
*B23B 51/00* (2006.01)

(52) U.S. Cl.
CPC ............ *B23B 2251/02* (2013.01); *B23C 5/109* (2013.01); *B23C 2210/02* (2013.01); *B23C 2210/03* (2013.01); *B23C 2240/32* (2013.01); *F16B 39/30* (2013.01); *Y10T 407/1906* (2015.01); *Y10T 408/907* (2015.01); *Y10T 408/9098* (2015.01)

(58) Field of Classification Search
CPC ......... Y10T 407/1946; Y10T 407/1948; Y10T 407/1906; Y10T 409/30952; Y10T 279/16; B23B 31/11; B23B 31/1107; B23B 31/1115; B23B 31/1122; B23C 2210/03; B23C 2240/32; B23C 5/10
USPC ......... 407/53, 54; 408/231, 233, 238, 239 R, 408/239 A; 409/234; 279/8, 99; 411/307
See application file for complete search history.

(56) References Cited

U.S. PATENT DOCUMENTS

| | | |
|---|---|---|
| 1,191,717 A | 7/1916 | Moore |
| 1,354,097 A | 9/1920 | Fitzsimmons |
| 1,407,335 A | 2/1922 | Reynolds |
| 1,615,233 A | 1/1927 | Redinger |
| 1,881,024 A | 10/1932 | Lang |
| 1,919,553 A | 7/1933 | Hawthorne |
| 2,079,692 A | 5/1937 | Lapointe |
| 2,158,120 A | 5/1939 | Hirschberg |
| 2,328,602 A | 9/1943 | Bechler |
| 2,367,841 A | 1/1945 | Monroe |
| 2,532,632 A | 12/1950 | MacArthur |
| 2,745,685 A | 5/1956 | Moore |
| 3,047,316 A | 7/1962 | Wehring et al. |
| 3,061,025 A | 10/1962 | Stockard, Jr. |
| 3,153,356 A | 10/1964 | Dearborn |
| 3,304,816 A | 2/1967 | Galorneau |
| 3,304,818 A | 2/1967 | Heaton |
| 3,326,581 A | 6/1967 | Wong |
| 3,454,070 A | 7/1969 | Phipard, Jr. |
| 3,521,507 A | 7/1970 | Yogus et al. |
| 3,568,353 A | 6/1971 | Lorenz et al. |
| 3,582,117 A | 6/1971 | Lundstrom |
| 3,876,319 A | 4/1975 | Meyer |
| 3,933,210 A | 1/1976 | Skidmore |
| 3,945,446 A | 3/1976 | Ostertag et al. |
| 4,113,290 A | 9/1978 | Miida |
| 4,158,973 A | 6/1979 | Schumacher, Jr. et al. |
| 4,262,400 A | 4/1981 | Miesch |
| 4,295,751 A | 10/1981 | Holmberg |
| 4,332,502 A | 6/1982 | Wormald et al. |
| 4,438,953 A | 3/1984 | Timme, Jr. |
| 4,489,963 A | 12/1984 | Raulins et al. |
| 4,521,042 A | 6/1985 | Blackburn et al. |
| 4,548,431 A | 10/1985 | Hall et al. |
| 4,629,222 A | 12/1986 | Dearden et al. |
| 4,688,832 A | 8/1987 | Ortloff et al. |
| 4,699,549 A | 10/1987 | Shimomura |
| 4,748,879 A | 6/1988 | von Haas |
| 4,828,294 A | 5/1989 | Bounie et al. |
| 4,842,464 A | 6/1989 | Green |
| 4,923,344 A | 5/1990 | Bieri |
| 4,955,644 A | 9/1990 | Pfeiffer et al. |
| 4,961,469 A | 10/1990 | Larsson et al. |
| 4,984,829 A | 1/1991 | Saigo et al. |
| 5,114,286 A | 5/1992 | Calkins |
| 5,169,183 A | 12/1992 | Hallez |
| 5,238,335 A | 8/1993 | Nomura |
| 5,415,243 A | 5/1995 | Lyon et al. |
| 5,492,375 A | 2/1996 | Smith |
| 5,496,137 A | 3/1996 | Ochayon et al. |
| 5,598,751 A | 2/1997 | Ochayon et al. |
| 5,607,263 A | 3/1997 | Nespeta |
| 5,624,213 A | 4/1997 | Anderson |
| 5,647,447 A | 7/1997 | Jones |
| 5,672,037 A * | 9/1997 | Iwata .................... F16B 39/30 411/311 |
| 5,695,304 A | 12/1997 | Ebert |
| 5,699,867 A | 12/1997 | Jones |
| 5,788,401 A | 8/1998 | Drenth |
| 5,810,401 A | 9/1998 | Mosing et al. |
| 5,863,162 A | 1/1999 | Karlsson et al. |
| 5,873,687 A | 2/1999 | Watanabe |
| 5,899,642 A | 5/1999 | Berglow et al. |
| 5,947,660 A | 9/1999 | Karlsson et al. |
| 5,971,670 A | 10/1999 | Pantzar et al. |
| 5,984,030 A | 11/1999 | Larsson et al. |
| 6,000,005 A | 12/1999 | Yamada |
| 6,012,881 A | 1/2000 | Scheer |
| 6,030,004 A | 2/2000 | Schock et al. |
| 6,086,291 A | 7/2000 | Hansson et al. |
| 6,109,841 A | 8/2000 | Johne |
| 6,120,067 A | 9/2000 | Mosing et al. |
| 6,158,785 A | 12/2000 | Beaulier |
| 6,241,433 B1 | 6/2001 | Rydberg |
| 6,244,631 B1 | 6/2001 | Payne et al. |
| 6,276,879 B1 | 8/2001 | Hecht |
| 6,299,180 B1 | 10/2001 | Satran et al. |
| 6,394,711 B1 | 5/2002 | Brosius |
| 6,406,226 B2 | 6/2002 | Kojima |
| 6,409,175 B1 | 6/2002 | Evans et al. |
| 6,447,025 B1 | 9/2002 | Smith |
| 6,485,061 B1 | 11/2002 | Mosing et al. |
| 6,485,220 B2 | 11/2002 | Hecht |
| 6,494,648 B2 | 12/2002 | Harpaz |
| 6,517,123 B2 | 2/2003 | Nishio |
| 6,524,034 B2 | 2/2003 | Eng et al. |
| 6,551,035 B1 | 4/2003 | Bruhn et al. |
| 6,565,291 B2 | 5/2003 | Harpaz et al. |
| 6,626,614 B2 | 9/2003 | Nakamura |
| 6,637,985 B2 | 10/2003 | Pokolm |
| 6,767,156 B1 | 7/2004 | Larsson |
| 6,783,308 B2 | 8/2004 | Lindblom |
| 6,810,956 B1 | 11/2004 | Sandstrom |
| 6,827,162 B2 | 12/2004 | Fisher |
| 6,845,826 B1 | 1/2005 | Feld et al. |
| 6,860,514 B2 | 3/2005 | Wentworth et al. |
| 7,004,692 B2 | 2/2006 | Hecht |
| 7,101,128 B2 | 9/2006 | Hansson |
| 7,189,039 B2 | 3/2007 | Pantzar |
| 7,210,710 B2 | 5/2007 | Williamson et al. |
| RE39,869 E | 10/2007 | Payne et al. |
| 7,329,073 B2 | 2/2008 | Jonsson et al. |
| 7,341,409 B2 | 3/2008 | Jonsson et al. |
| 7,374,376 B2 | 5/2008 | Jonsson et al. |
| 7,407,351 B2 | 8/2008 | Pantzar et al. |
| 7,431,543 B2 | 10/2008 | Buettiker |
| 7,478,978 B2 | 1/2009 | Jonsson et al. |
| 7,513,724 B2 | 4/2009 | Kakai |
| D602,511 S | 10/2009 | Sandoval et al. |
| 7,611,311 B2 | 11/2009 | Kakai et al. |
| 7,624,822 B2 | 12/2009 | Olsson et al. |
| 7,713,004 B2 | 5/2010 | Lehto et al. |
| 7,775,287 B2 | 8/2010 | Duggan et al. |
| 7,980,795 B2 | 7/2011 | Berglow et al. |
| 8,066,307 B2 | 11/2011 | Wahlstrom et al. |
| 8,226,333 B2 | 7/2012 | Kakai et al. |
| 8,245,798 B2 | 8/2012 | Nava et al. |
| 8,262,139 B2 | 9/2012 | Nava |
| 8,286,972 B2 | 10/2012 | Haimer |
| 8,312,615 B2 | 11/2012 | Frota de Souza Filho |
| 8,366,119 B2 | 2/2013 | Rimet |
| 8,408,848 B2 | 4/2013 | Hecht |
| 8,556,550 B2 | 10/2013 | Lutz et al. |
| 8,662,800 B2 | 3/2014 | Guay |
| 8,668,413 B2 | 3/2014 | Volokh |
| 8,690,500 B2 | 4/2014 | Spichtinger |
| 2001/0041089 A1 * | 11/2001 | Hecht .................... B23B 31/11 403/343 |

(56) References Cited

U.S. PATENT DOCUMENTS

| | | |
|---|---|---|
| 2002/0021945 A1 | 2/2002 | Harpaz |
| 2002/0159851 A1 | 10/2002 | Krenzer |
| 2003/0021651 A1 | 1/2003 | Suzuki et al. |
| 2003/0068209 A1 | 4/2003 | Leibhard |
| 2003/0210963 A1 | 11/2003 | Kakai et al. |
| 2004/0208716 A1 | 10/2004 | Krenzer |
| 2005/0129477 A1 | 6/2005 | Pantzar |
| 2006/0062642 A1 | 3/2006 | Jonsson |
| 2006/0072977 A1 | 4/2006 | Jonsson |
| 2006/0073744 A1* | 4/2006 | Jonsson ............. B23B 31/11 439/884 |
| 2006/0257215 A1 | 11/2006 | Kakai |
| 2007/0116539 A1 | 5/2007 | Malik et al. |
| 2007/0248421 A1 | 10/2007 | Kakai et al. |
| 2009/0010709 A1 | 1/2009 | Berglow et al. |
| 2010/0123311 A1 | 5/2010 | Church |
| 2011/0013999 A1 | 1/2011 | Moseley et al. |
| 2011/0211921 A1 | 9/2011 | Volokh |
| 2011/0280683 A1 | 11/2011 | Galipaud |
| 2011/0309588 A1 | 12/2011 | Heinloth et al. |
| 2012/0009027 A1 | 1/2012 | Sharivker et al. |
| 2012/0020749 A1 | 1/2012 | Maeda et al. |
| 2012/0093602 A1 | 4/2012 | Osawa et al. |
| 2012/0208147 A1 | 8/2012 | Krumsiek |
| 2013/0022415 A1 | 1/2013 | Osawa |
| 2013/0023669 A1 | 1/2013 | Korolev |
| 2013/0051935 A1 | 2/2013 | Schuffenhauer |
| 2013/0272806 A1 | 10/2013 | Guay |
| 2014/0056658 A1 | 2/2014 | Maeda |
| 2014/0360334 A1 | 12/2014 | Singer-Schnoeller |
| 2015/0016905 A1 | 1/2015 | Haimer |
| 2015/0151365 A1 | 6/2015 | Haimer |
| 2015/0202690 A1 | 7/2015 | Haimer |
| 2015/0217380 A1 | 8/2015 | Haimer |
| 2015/0360295 A1 | 12/2015 | Haimer |

FOREIGN PATENT DOCUMENTS

| | | |
|---|---|---|
| CN | 104001980 A | 8/2014 |
| CN | 104001981 A | 8/2014 |
| DE | 1266613 B | 4/1968 |
| DE | 2 602 162 | 1/1986 |
| DE | 3912503 A1 | 3/1990 |
| DE | 202 02 053 U1 | 2/2002 |
| DE | 10 2005 012 025 A1 | 12/2006 |
| DE | 10 2012 100 976 B4 | 4/2014 |
| EP | 0 240 917 A2 | 1/1987 |
| EP | 0551540 A1 | 1/1992 |
| EP | 0 340 187 B1 | 1/1993 |
| EP | 0551540 A1 | 7/1993 |
| EP | 0 771 934 A2 | 10/1996 |
| EP | 0 771 400 B1 | 5/2001 |
| EP | 0771934 B1 | 4/2003 |
| EP | 0 815 340 B1 | 5/2003 |
| EP | 0 897 504 B1 | 9/2003 |
| EP | 1 127 209 B1 | 5/2004 |
| EP | 1 232 321 B1 | 7/2004 |
| EP | 1 280 624 B1 | 1/2006 |
| EP | 1 847 345 B1 | 3/2007 |
| EP | 0 777 545 B2 | 7/2010 |
| EP | 2 418036 B1 | 7/2013 |
| FR | 1019411 | 6/1950 |
| FR | 1022682 | 7/1950 |
| FR | 1019411 A | 1/1953 |
| FR | 1022682 A | 3/1953 |
| FR | 2602162 | 4/1986 |
| FR | 2602162 A1 | 2/1988 |
| GB | 191324122 | 10/1914 |
| GB | 765943 | 1/1957 |
| GB | 844212 | 8/1960 |
| JP | 62-188617 A | 8/1987 |
| JP | 2003011016 A | 1/2003 |
| JP | 2011161583 A | 8/2011 |
| JP | 2012071391 A | 4/2012 |
| WO | 02076661 A1 | 10/2002 |
| WO | WO02076661 A1 | 10/2002 |
| WO | 03068436 A1 | 8/2003 |
| WO | WO03068436 A1 | 8/2003 |
| WO | 2006033616 A1 | 3/2006 |
| WO | WO2006033616 A1 | 3/2006 |
| WO | 2006050952 A1 | 5/2006 |
| WO | WO2006050952 A1 | 5/2006 |
| WO | 2011/019105 A1 | 2/2011 |
| WO | 2011/138360 A1 | 11/2011 |
| WO | 2013/146882 A1 | 10/2013 |
| WO | 2014/026975 A1 | 2/2014 |
| WO | 2014118264 A1 | 8/2014 |
| WO | WO2014118264 A1 | 8/2014 |
| WO | 2015032996 A1 | 3/2015 |
| WO | WO2015032996 A1 | 3/2015 |

OTHER PUBLICATIONS

Jul. 30, 2015 International Search Report Received PCTUS2015029408.
Jul. 30, 2015—Written Opinion.
Jun. 17, 2015 Office action.
Dec. 14, 2015 Final Office Action.
Mar. 18, 2016 Office action.
Jun. 17, 2016 Office action.
Aug. 26, 2016 Final Office Action.
Nov. 17, 2016 International preliminary report on patentability received.
Nov. 17, 2016 International preliminary report on patentability recieved.

* cited by examiner

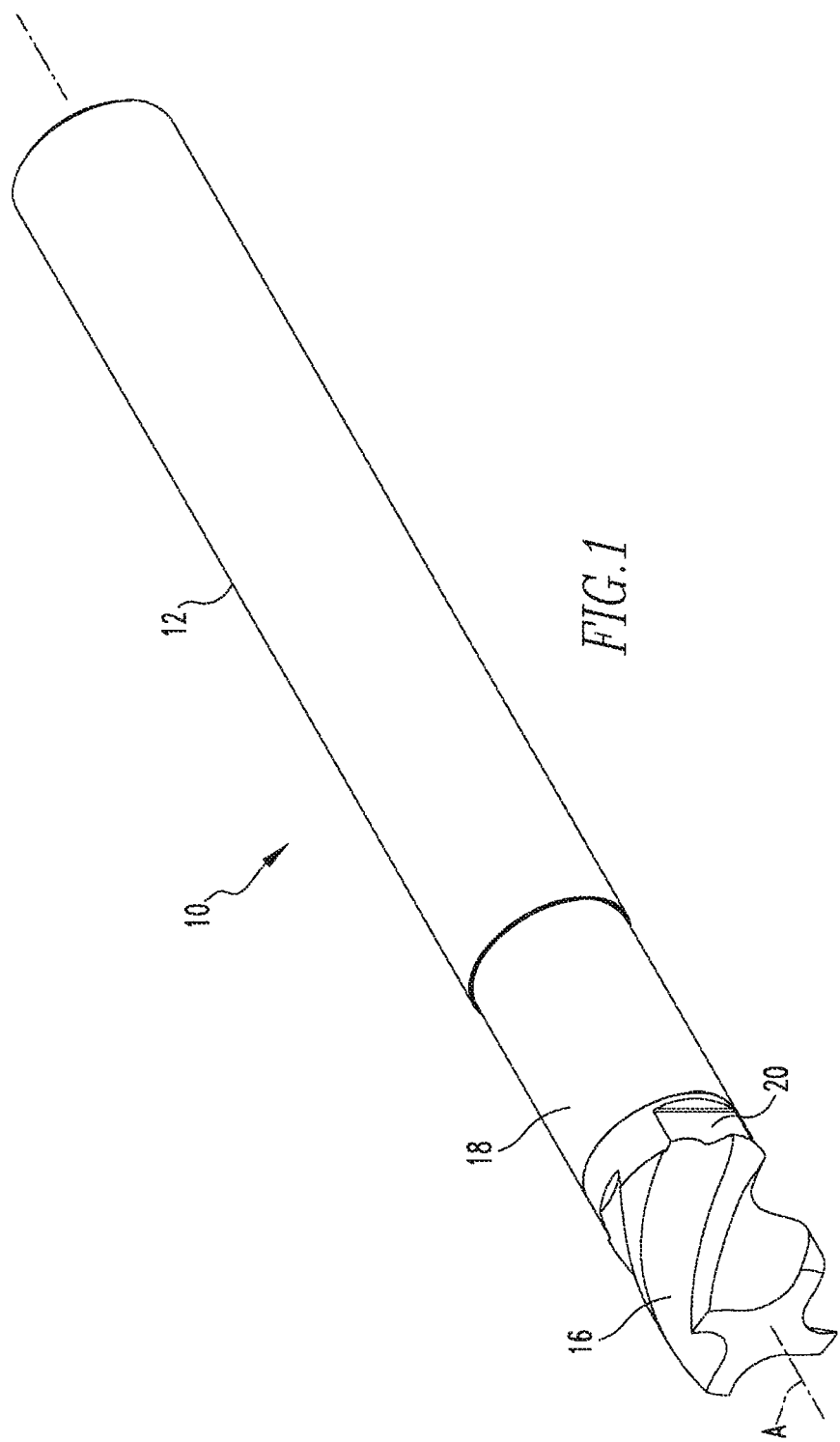

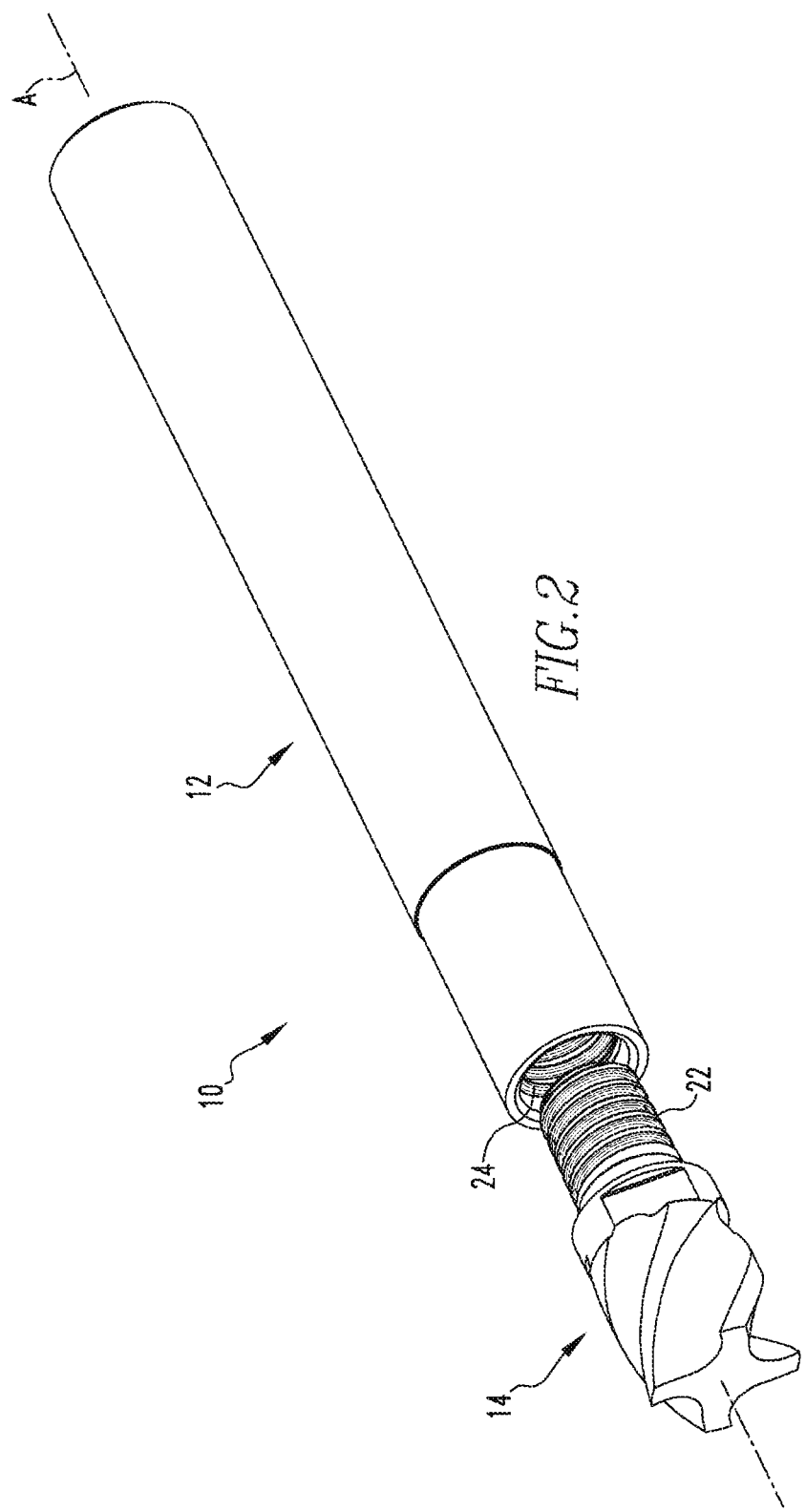

COUPLING MECHANISM FOR CUTTING TOOL

CROSS-REFERENCE TO EARLIER APPLICATION

This patent application is a continuation-in-part of pending U.S. patent application Ser. No. 13/950,407 filed on Jul. 25, 2013 for a COUPLING MECHANISM FOR CUTTING TOOL to Ruy Frota De Souza et al. wherein applicants claim the benefit under the United States Patent Statute including 35 USC 120 of such pending U.S. patent application Ser. No. 13/950,407 filed on Jul. 25, 2013. Further, applicants hereby incorporate by reference herein the entirety of such pending U.S. patent application Ser. No. 13/950,407 filed on Jul. 25, 2013 for a COUPLING MECHANISM FOR CUTTING TOOL.

BACKGROUND

Field of the Invention

The present invention relates to coupling mechanisms for use with rotary cutting tools and, more particularly, to rotary cutting tools including such coupling mechanisms.

Background Information

Historically, end mills for metal cutting machinery were produced as a single unit, comprising a fluted cutting portion and a cylindrical or conical shank portion sized to fit a machine spindle. However, increasing global pricing of modern tool alloys along with recently developed intricate surface treatments have made such single units less economical, as the expensive shank material is generally wasted. It has therefore became common practice to produce a separate cutter made of high quality alloy or sintered carbide, which is then concentrically attached to the end of a reusable steel shank.

It is highly desirable that the cutter be easily replaced, upon wear, while leaving the shank in the machine spindle, such that no further adjustments are required after cutter replacement. A major requirement related to such accurate milling applications is that each replacement cutter be repeatedly, accurately, centered to the true spindle axis of rotation and axially positioned correctly.

One basic method currently in use for joining the cutter to the shank is disclosed for example in U.S. Pat. No. 5,114,286, which teaches an interchangeable cutting tool alignment and positioning system comprising a first tool segment having a male coupler and a second tool segment having a female coupler. The male coupler comprises a pilot in the form of first cylindrical mating surface, a concentric aligner in the form of second cylindrical mating surface spaced apart from the pilot, a male thread extending between the pilot and the concentric aligner and an axial stop in the form of planar surface. The female coupler comprises a pilot bore in the form of complementary cylindrical mating surface, corresponding to the cylindrical mating surface of the pilot, a concentric bore in the form of a complementary cylindrical mating surface corresponding to the cylindrical mating surface of the concentric aligner, a female thread extending between the pilot bore and the concentric bore, and an axial stop in the form of complementary planar surface.

The described pilot, concentric aligner, pilot bore and concentric bore, are necessary because the threaded coupler by its own is not sufficiently accurate for such repeated replacement of cutters.

Further improvements to the above basic concept are also known. For instance, U.S. Pat. No. 6,485,220 discloses a frustoconical radial alignment instead of a cylindrical alignment, as well as a strengthened thread root and U.S. Pat. No. 7,329,073 describes adjacent axial and radial stop surfaces.

Nevertheless all the above described solutions suffer from restrictive production requirements. Typical production tolerances of the cylindrical mating surfaces on the cutter and shank, sufficient for satisfying the need of replaceable cutters falling repeatedly in the desired range of concentricity and axis position, are less than 5 micrometers. Such close tolerances necessitate an additional grinding process.

Furthermore, sintered carbide cutters by their nature are very hard yet also very brittle. Direct coupling of the hard cutter to the steel shank imposes stresses on the coupling where the two different materials engage. More particularly, in cases where a carbide cutter is threaded into a steel shank, failure of the connection is likely to occur at or near the base of the threaded portion of the carbide cutter, which commonly also damages the steel shank, rendering it unsuitable for reuse.

Hence there is room for improvement in coupling mechanisms for use with rotary cutting tools and also to rotary cutting tools including such coupling mechanisms.

SUMMARY OF THE INVENTION

As one aspect of the present invention a rotary cutting tool is provided. The rotary cutting tool comprises a cutter of generally cylindrical shape disposed about a central longitudinal axis. The cutter includes a first end having an active fluted portion and an opposite second end, the second end having a male threaded portion disposed thereabout. The rotary cutting tool further comprises a shank of generally cylindrical shape disposed about the central longitudinal axis, the shank having a recessed female threaded portion formed in a first end. The male threaded portion includes a number of threads disposed at a first pitch and the female threaded portion includes a number of threads disposed at a second pitch different than the first pitch. The cutter and the shank are selectively coupled via threaded engagement of the male threaded portion and the female threaded portion.

The first pitch may be less than the second pitch.

The first pitch may be about 0.005 mm less than the second pitch.

The difference between the first pitch and the second pitch may be in the range of about 0.002 to about 0.010 mm.

The cutter may be formed from a carbide material and the shank may be formed from a tool steel.

The cutter may comprise an outward facing circumferential surface extending a distance along the central longitudinal axis disposed between the active fluted portion and the male threaded portion, the shank may comprise an inward facing circumferential surface extending a distance along the central longitudinal axis between the female threaded portion and the first end of the shank, and the outward facing circumferential surface may be disposed adjacent to, and facing the inward facing circumferential surface when the male threaded portion and the female threaded portion are threadedly engaged.

The outward facing circumferential surface may be generally in the form of a portion of a truncated cone disposed at a first angle with respect to the central longitudinal axis and the inward facing circumferential surface may be generally in the form of a portion of a truncated cone disposed at a second angle with respect to the central longitudinal axis.

The first angle may be in the range of about 1° to about 7°.

The second angle may be in the range of about 1° to about 7°.

The outward facing circumferential surface may be generally a cylindrical surface disposed parallel to the central longitudinal axis and the inward facing circumferential surface may be generally a cylindrical surface disposed parallel to the central longitudinal axis.

The cutter may comprise an outward facing circumferential surface extending a distance along the central longitudinal axis disposed adjacent the male threaded portion and opposite the active fluted portion, the shank may comprise an inward facing circumferential surface extending a distance along the central longitudinal axis adjacent the female threaded portion opposite the first end of the shank, and the outward facing circumferential surface may be disposed adjacent to, and facing the inward facing circumferential surface when the male threaded portion and the female threaded portion are threadedly engaged.

The outward facing circumferential surface may be disposed at an angle in the range of 0° to about 6° with respect to the central longitudinal axis.

The inward facing circumferential surface may be disposed within the range of 0° to 2° of the angle of the outward facing circumferential surface.

The cutter may comprise a first outward facing circumferential surface extending a distance along the central longitudinal axis disposed between the active fluted portion and the male threaded portion and a second outward facing circumferential surface extending a distance along the central longitudinal axis adjacent the male threaded portion and opposite the active fluted portion, the shank may comprise a first inward facing circumferential surface extending a distance along the central longitudinal axis between the female threaded portion and the first end of the shank and a second inward facing circumferential surface extending a distance along the central longitudinal axis adjacent the female threaded portion opposite the first end of the shank, the first outward facing circumferential surface may disposed adjacent to, and facing the first inward facing circumferential surface when the male threaded portion and the female threaded portion are threadedly engaged, and the second outward facing circumferential surface may be disposed adjacent to, and facing the second inward facing circumferential surface when the male threaded portion and the female threaded portion are threadedly engaged.

As another aspect of the present invention, a rotary cutting tool is provided. The rotary cutting tool comprises: a cutter of generally cylindrical shape disposed about a central longitudinal axis, the cutter having a first end having an active fluted portion and an opposite second end, the second end having a male threaded portion disposed thereabout; and a shank of generally cylindrical shape disposed about the central longitudinal axis, the shank having a recessed female threaded portion formed in a first end. The male threaded portion includes a number of threads disposed at a first pitch and at a first taper angle, the female threaded portion includes a number of threads disposed at a second pitch and at a second taper angle different than the first taper angle, and the cutter and the shank are selectively coupled via threaded engagement of the male threaded portion and the female threaded portion.

The first taper angle may be less than the second taper angle.

The first pitch may be equal to the second pitch or the first pitch may be less than the second pitch.

BRIEF DESCRIPTION OF THE DRAWINGS

Concepts of the present invention will now be described in connection with certain non-limiting embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 1 shows an isometric view of an example embodiment of a modular rotary cutting tool in accordance with the present invention.

FIG. 2 shows an exploded isometric view of the modular cutting tool of FIG. 1.

In the figures, equivalent parts are provided with the same reference signs.

DESCRIPTION OF EXEMPLARY EMBODIMENTS

As used herein, the term "number" shall refer to any non-zero quantity (i.e., one or any quantity greater than one).

As used herein, the term "selectively coupled" shall mean that two or more components are coupled or joined together in a manner which may be selectively undone (i.e., uncoupled) without damaging either of the components.

As used herein, the term "pitch" shall refer to the distance measured parallel to a central axis of a threaded member between corresponding points on adjacent thread forms in the same axial plane and on the same side of the axis.

FIGS. 1-5 show a modular rotary cutting tool 10 according to a first example embodiment of the invention disposed about a central longitudinal axis A. Cutting tool 10 includes a reusable shank 12 and a replaceable cutter 14, selectively coupled together by a coupling mechanism (not numbered) formed from cooperating portions of each of shank 12 and cutter 14 which are discussed in detail below. In the example embodiment shown in FIGS. 1-5, cutter 14 is in the form of an end mill formed from a carbide material, however, it is to be appreciated that another rotary cutting tool, e.g., without limitation, a face mill, rounded tip mill, slitting mill, drill, reamer, or any other replaceable tip for milling, drilling, reaming or other metal cutting applications, formed from carbide or other suitable material or materials may be employed without varying from the scope of the present invention. Shank 12 may be formed from steel, carbide or other suitable material formed in a generally cylindrical shape with a slightly stepped portion, however, it is to be appreciated that other cross-sections, shapes, and materials may also be employed without varying from the scope of the present invention. It is also to be appreciated that shank 12 may be formed as a generally solid member, as shown in the illustrated embodiment of FIG. 1-5, or may include one or more internal passages through which a flow of coolant and/or lubricant may be provided to cutter 14.

Figure 1B:
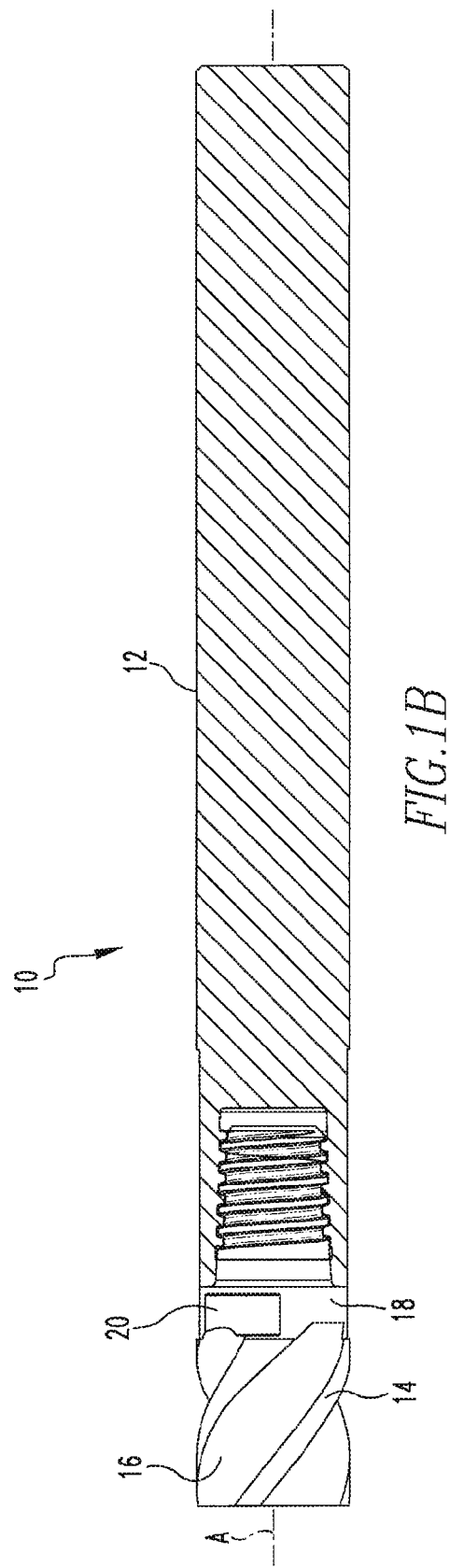
FIG. 1B shows a side view of the modular cutting tool of FIG. 1 with the shank portion shown in cross-section.

Continuing to refer to FIG. 1, the exposed portion of the cutter 14 (when installed in shank 12) may include an active fluted portion 16 structured to perform cutting operations on a workpiece (not shown), followed by a short cylindrical portion 18. The cylindrical portion 18 is preferably equipped with at least two opposing parallel flats 20 (only one visible in FIG. 1) formed therein/on, on which a standard spanner wrench (not shown) may engage for installing or removing cutter 14 from shank 12, as discussed further below.

Figure 3:
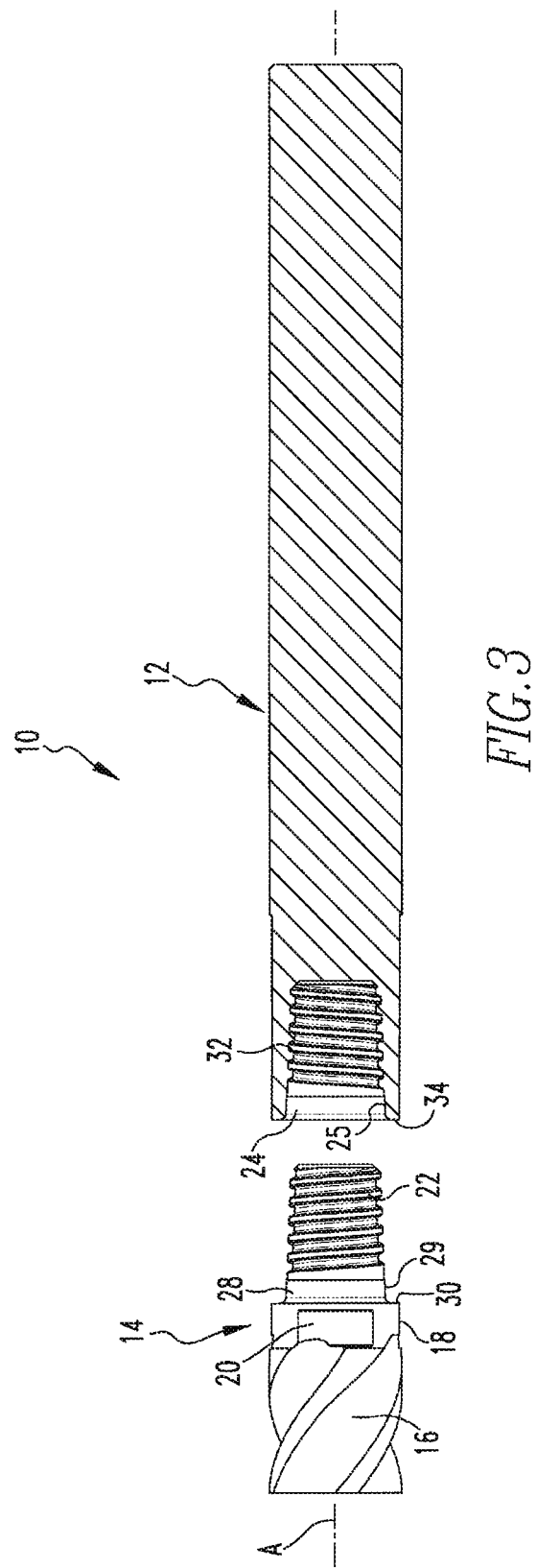
FIG. 3 shows an exploded side view of the modular cutting tool of FIG. 1 with the shank portion shown in cross-section to show internal details.
Figure 4:
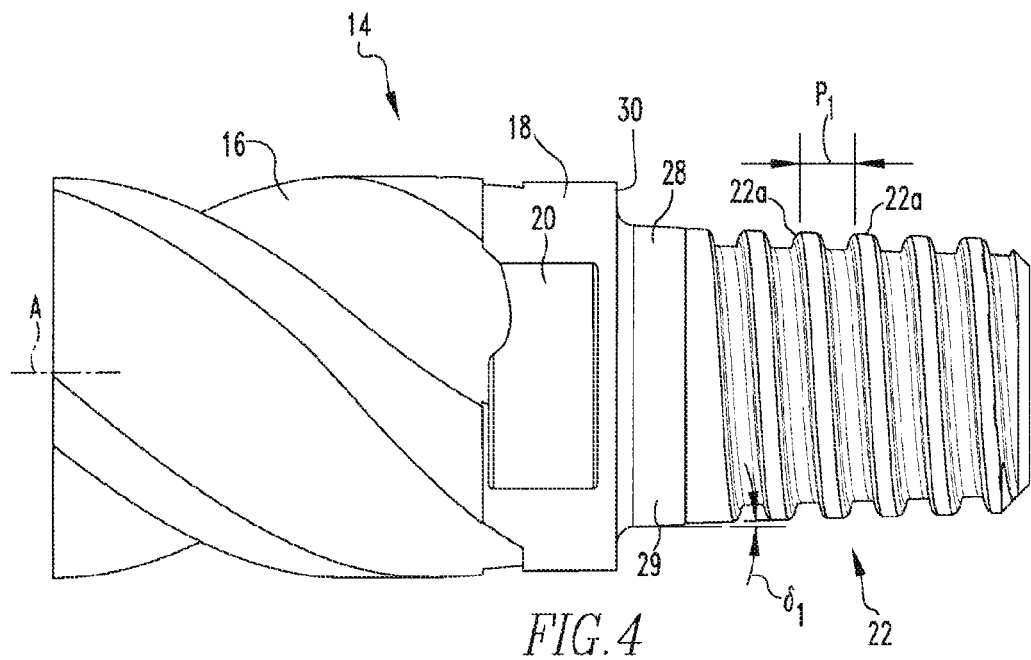
FIG. 4 shows a detail side view of the cutter portion of the rotary cutting tool of FIG. 1.
Figure 5:
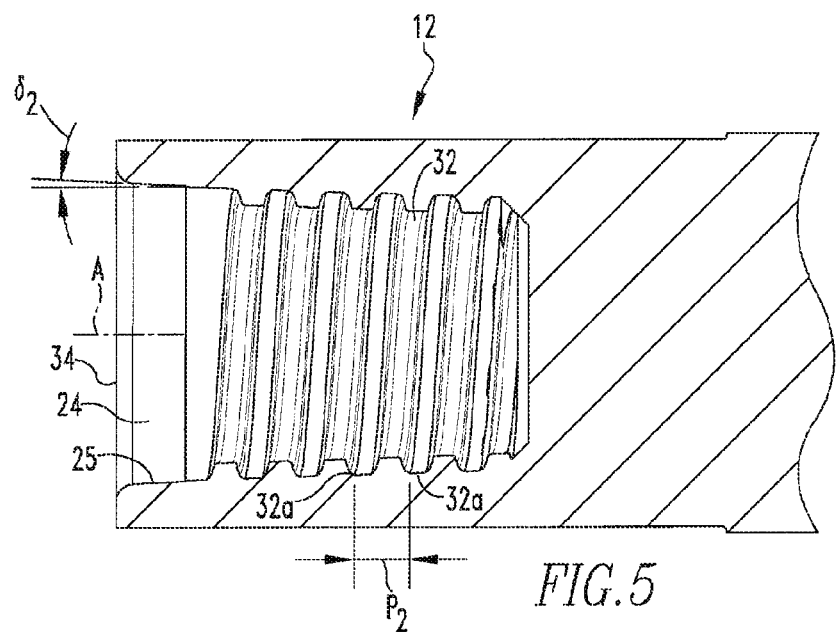
FIG. 5 shows a detail cross-sectional view of a portion of the shank portion of the rotary cutting tool of FIG. 1.

The exploded views of FIGS. 2 and 3 and detail views of FIGS. 4 and 5 show details of the portions of shank 12 and cutter 14 which form the coupling mechanism between cutter 14 and shank 12. More particularly, the coupling mechanism includes, as part of cutter 14: an outwardly protruding male threaded portion 22 extending opposite active fluted portion 16; a radial aligner portion 28 disposed concentric to the longitudinal axis A and extending between the short cylindrical portion 18 and the threaded portion 22; and a flat axial stop shoulder 30 which bridges the radial gap between the smaller diameter, radial aligner 28, and the larger diameter, short cylindrical portion 18. As shown in the illustrated example embodiment, shoulder 30 may disposed perpendicular to the longitudinal axis A. In other embodiments, shoulder 30 may be slightly inclined (up to) +/−3° to a reference drawn perpendicular to the longitudinal axis A.

The coupling mechanism also includes, as part of shank 12: a generally smooth alignment bore 24 disposed concentric to longitudinal axis A, a female threaded bore 32 extending from the alignment bore 24, and an axial stop surface 34 disposed perpendicular to the longitudinal axis A at an end of shank 12 adjacent the alignment bore 24.

Referring to the detail view of cutter 14 shown in FIG. 4, the radial aligner portion 28 is formed generally as a portion of a truncated cone and includes an outward facing circumferential surface 29 disposed at an angle $\delta_1$ relative to longitudinal axis A. In example embodiments of the present invention, the angle $\delta_1$ is generally in the range of about 1° to about 7°. Alternatively, radial aligner portion 28 may be of generally cylindrical shape (i.e., $\delta_1$=0 degrees). In general, a truncated cone has been found to be preferable when the cutter 14 is coupled with steel shanks while the cylindrical shape has been found to be preferable when the cutter 14 is coupled with carbide shanks.

Referring to the cross-sectional detail view of an end portion of shank 12 shown in FIG. 5, the alignment bore 24 is formed in a generally corresponding shape to aligner portion 28. In general, the diameter of the aligner portion 28 may be slightly larger (preferred for steel shanks) or equal to (preferred for carbide shanks) than the diameter of the alignment bore 24.

As the alignment bore 24 is formed in a generally corresponding shape to aligner portion 28, in the illustrated embodiment alignment bore 24 is also formed generally as a portion of a truncated cone and includes an inward facing circumferential surface 25 disposed at an angle $\delta_2$ relative to the longitudinal axis A. As the inward facing circumferential surface 25 of shank 12 generally cooperates with the outward facing circumferential surface 29 of cutter 14, in example embodiments of the present invention, the angle $\delta_2$ generally is in the range of from about 0° to about 7° depending on the angle $\delta_1$ of the outward facing circumferential surface 29.

Referring to FIGS. 4 and 5, threaded portion 22 of cutter 14 includes a number of threads 22a, preferably at least 4 (although other numbers may be employed), disposed at a first pitch $P_1$ about longitudinal axis A and threaded bore 32 includes at least a corresponding number of female threads 32a disposed about longitudinal axis A at a second pitch $P_2$, which is different than $P_1$. In the example embodiment shown in FIGS. 1-5, the second pitch $P_2$ is greater than the first pitch $P_1$ by about 0.005 mm. By utilizing a larger pitch $P_2$ in the threaded bore 34 of the shank 12, and thus a smaller pitch $P_1$ in cutter 14, the resulting stress on threaded portion 22 of cutter 14 when coupled with shank 12 is dispersed more evenly among the threads 22a as compared to an embodiment in which cooperating threads of generally the same pitch are utilized. In example embodiments of the present invention, thread pitches varying from about 0.002-0.010 mm between the respective threads of the shank 12 and cutter 14 have been employed. In contrast to embodiments of the present invention, in instances where cooperating threads of generally the same pitch are utilized stress is generally concentrated at the thread closest to axial stop shoulder 30 due to the general inelasticity of the carbide or steel cutter 14. By more evenly distributing the stress among the threads 22a of threaded portion 22, embodiments of the present invention allow for higher loads to be applied to the connection before failure.

Assembly of the modular cutting tool assembly 10 is performed by engaging the threaded portion 22 of cutter 14 with the threaded bore 32 of the shank 12 and subsequently rotating one or both of the cutter 14 and/or shank 12 until the radial aligner portion 28 of cutter 14 is seated within the alignment bore 24 of shank 12 and the axial stop shoulder 30 of the cutter 14 abuts the axial stop surface 34 of the shank 12. The axial position of cutter 14 with respect to shank 12 is derived from the direct contact of stop shoulder 30 of cutter 14 with the axial stop surface 34 of shank 12. Once stop shoulder 30 and stop surface 34 are engaged, the coupling is preferably further tightened to a specified torque using a torque limiting wrench to avoid excessive tension of the cutter 14.

Figure 6:
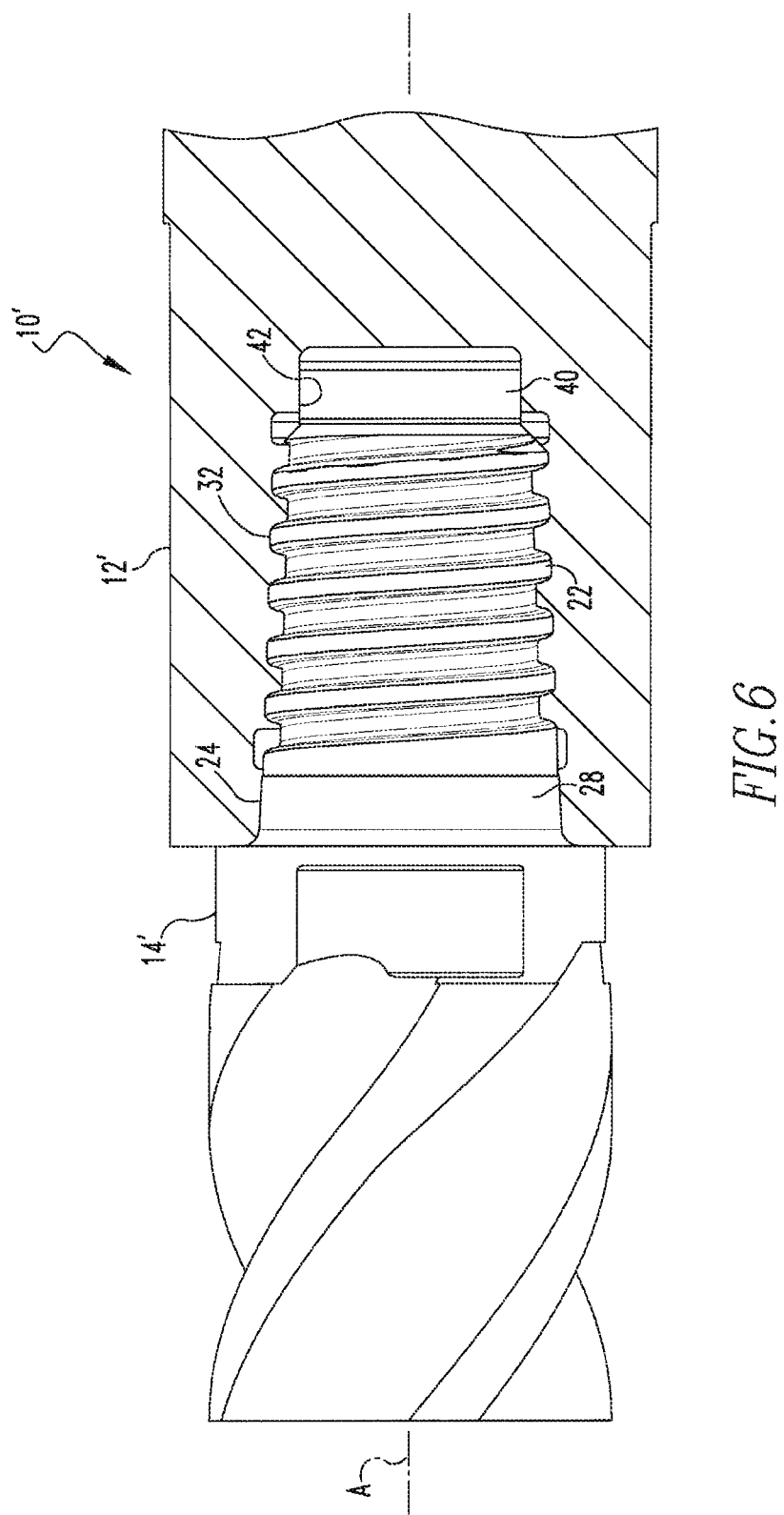
FIG. 6 shows a side view of another example embodiment of a coupling mechanism in accordance the present invention shown partially in cross-section to show internal details.

FIG. 6 shows a detail view of another embodiment of a coupling mechanism between a shank 12' (shown in cross-section) and a cutter 14' of a modular cutting tool 10'. The cutting tool 10' may be of similar outward appearance to cutting tool 10, previously described, and cutter 14' and shank 12' interact in a similar manner as cutter 14 and shank 12 aside from the inclusion of a second radial aligner portion 40 disposed adjacent threaded portion 22 opposite radial aligner portion 28. When cutter 14' is coupled with shank 12', such as shown in FIG. 6, the outward facing circumferential surface (not numbered) of the second radial aligner portion 40 engages the inward facing circumferential surface (not numbered) of a second alignment bore 42 formed in shank 12' adjacent threaded bore 32 opposite first alignment bore 24. In example embodiments of the present invention, radial aligner portion 40 is of generally similar, or slightly smaller diameter than the diameter of the second alignment bore 42. Also, the surface (not numbered) of second radial aligner portion 40 may be disposed at angles ranging from 0° to about 6° with respect to the central longitudinal axis A, while the surface (not numbered) of the second alignment bore 42 may be disposed at the same angle, or within a range of 1°-2° of the angle of the surface of the second radial aligner portion 40. Although shown having second radial aligner portion 40 in addition to radial aligner portion 28, it is to be appreciated that embodiments of the present invention may include only second radial alignment portion 40 without radial alignment portion 28.

Figure 7:
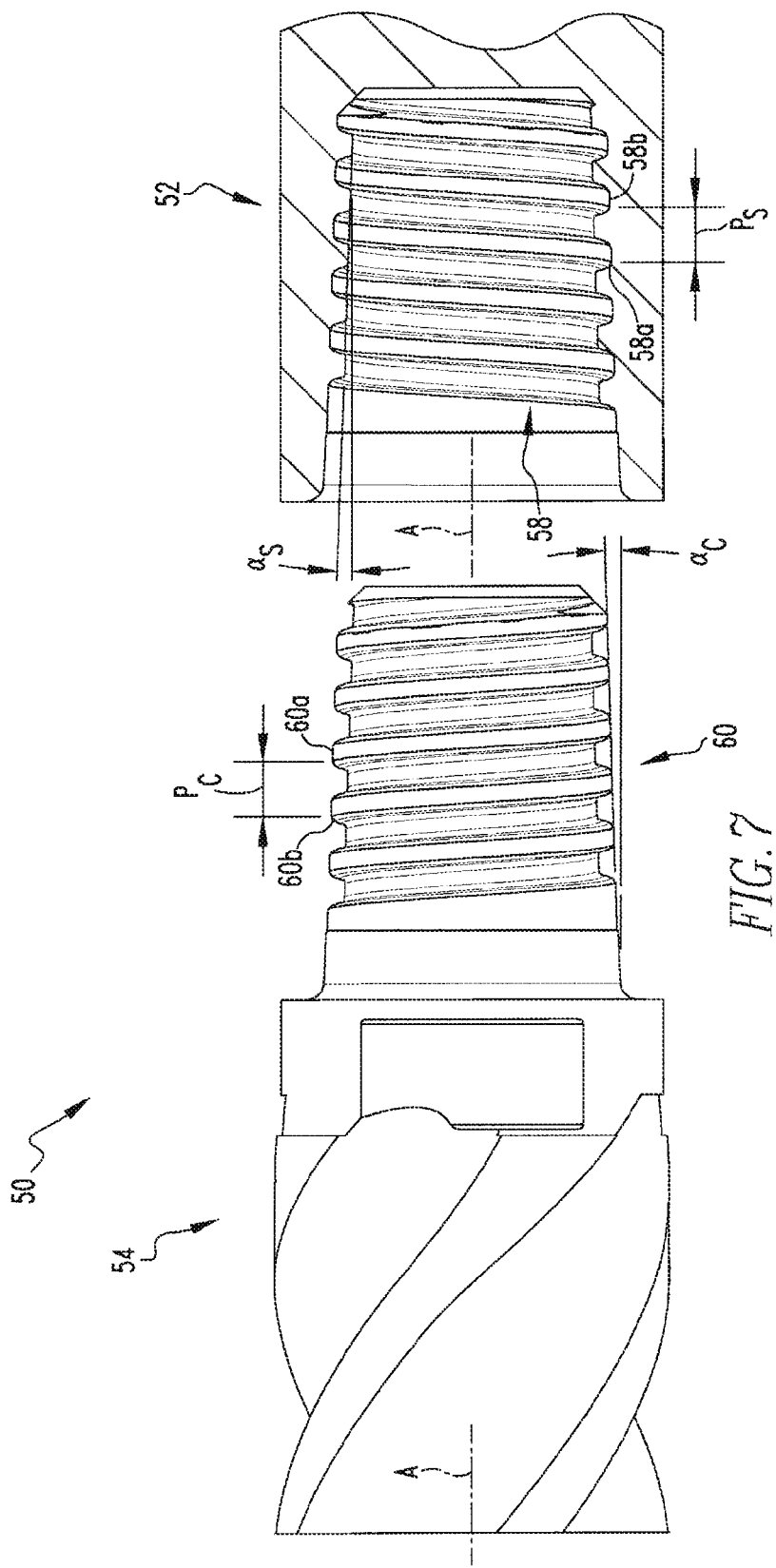
FIG. 7 shows an exploded side view of another example embodiment of a modular cutting tool in accordance with the present invention with the shank portion shown in cross-section to show internal details.

FIG. 7 shows an exploded side view of another example embodiment of a modular cutting tool 50 in accordance with the present invention which includes a shank 52 and a cutter 54 coupled via another coupling mechanism in accordance with the present invention. Shank 52 and cutter 54 may be of generally similar construction as shanks 12, 12' and cutters 14, 14' previously described and respectively include a female threaded bore 58 (including female threads 58a, 58b) and a male threaded portion 60 (including male threads 60a, 60b). However, unlike the embodiments previously discussed, in which different thread pitches on the male and female threaded portions were utilized to distribute stress more evenly throughout the threads when the two components were tightly threadedly coupled together, the embodiment illustrated in FIG. 7 accomplishes a similar result by orienting the male and female threaded portions at different angles with respect to each other. For example, in the embodiment illustrated in FIG. 7, the threads 60a, 60b of the male threaded portion 60 are disposed at a first taper angle $\alpha_C$ (measured with respect to a reference disposed parallel to the central longitudinal axis A) while the threads 58a, 58b of the female threaded bore 58 are disposed at a second taper angle $\alpha_S$ (measured with respect to a reference disposed parallel to the central longitudinal axis A). More particularly, by disposing the female threads 58a, 58b at a second taper angle $\alpha_S$ greater than the first taper angle $\alpha_C$ of the male threads 60a, 60b, a spatial relationship between the male and female threaded portions 58, 60 similar to that created by the use of different thread pitches as previously discussed is created even when the thread pitches $P_S$ and $P_C$ are the same. It is to be appreciated that such embodiment could also be utilized with different thread pitches $P_S$ and $P_C$ as an alternative to being used with portions having the same pitch.

Figure 8:
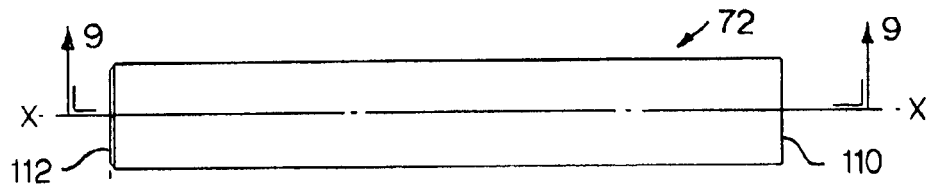
FIG. 8 is a side view of the shank portion of another specific embodiment of a rotary cutting tool.
Figure 9:
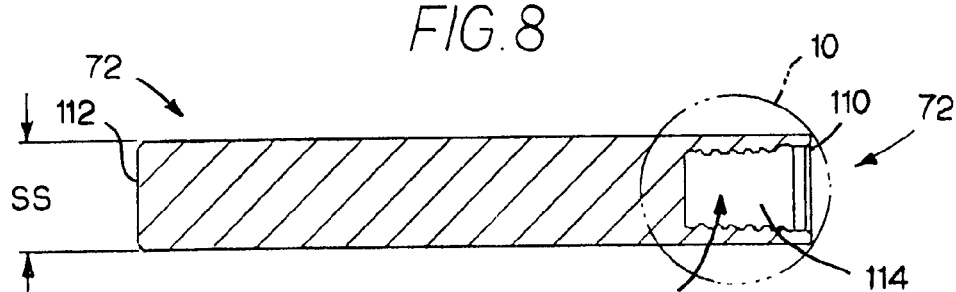
FIG. 9 shows a cross-sectional view of the shank portion of FIG. 8 taken along section line 9-9 of FIG. 8.
Figure 10:
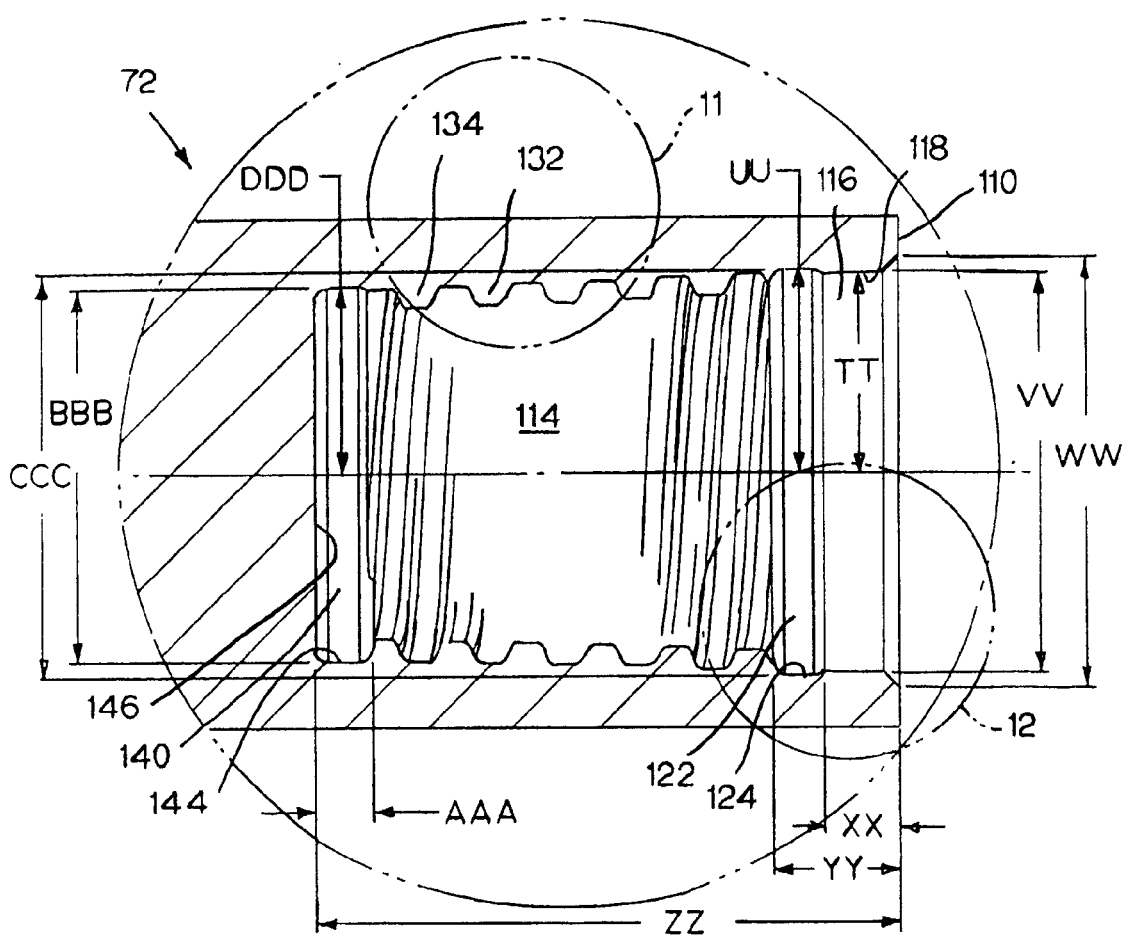
FIG. 10 is an enlarged view of a portion of the shank portion of FIG. 9 encompassed by the circle designated as 10 in FIG. 9.
Figure 11:
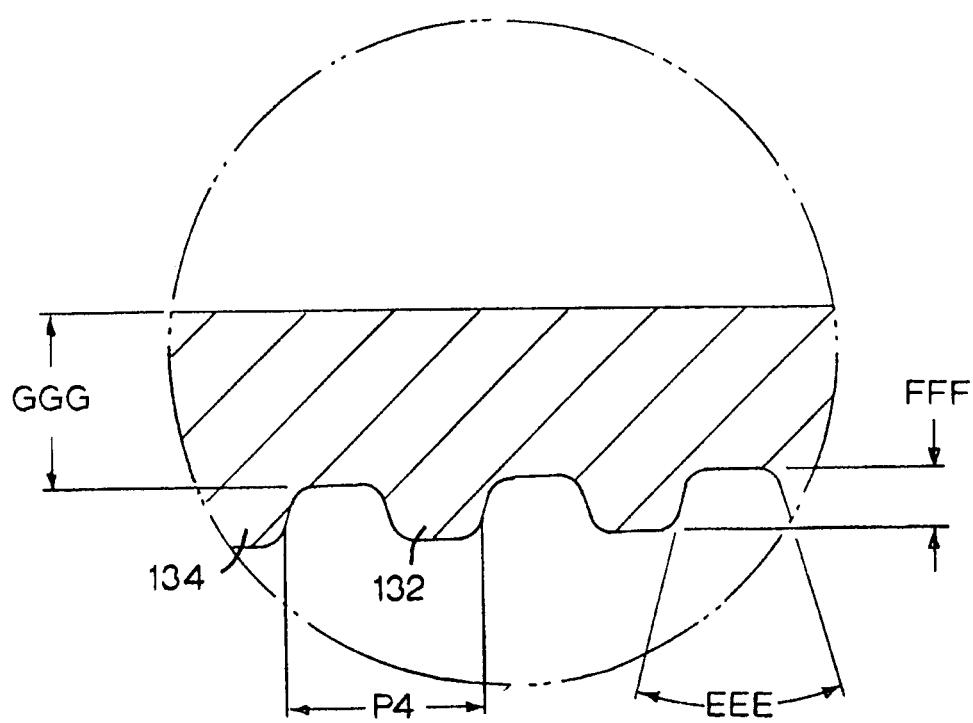
FIG. 11 is an enlarged view of the portion of the shank portion of FIG. 10 encompassed by the circle designated as 11 in FIG. 10.
Figure 12:
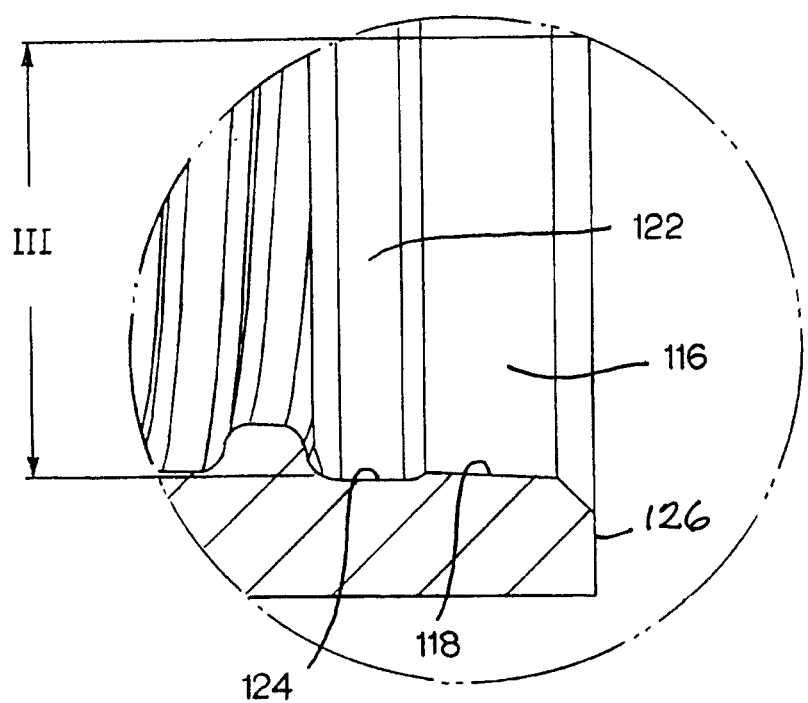
FIG. 12 is an enlarged view of the portion of the shank portion of FIG. 10 encompassed by the circle designated as 12 in FIG. 10.
Figure 13:
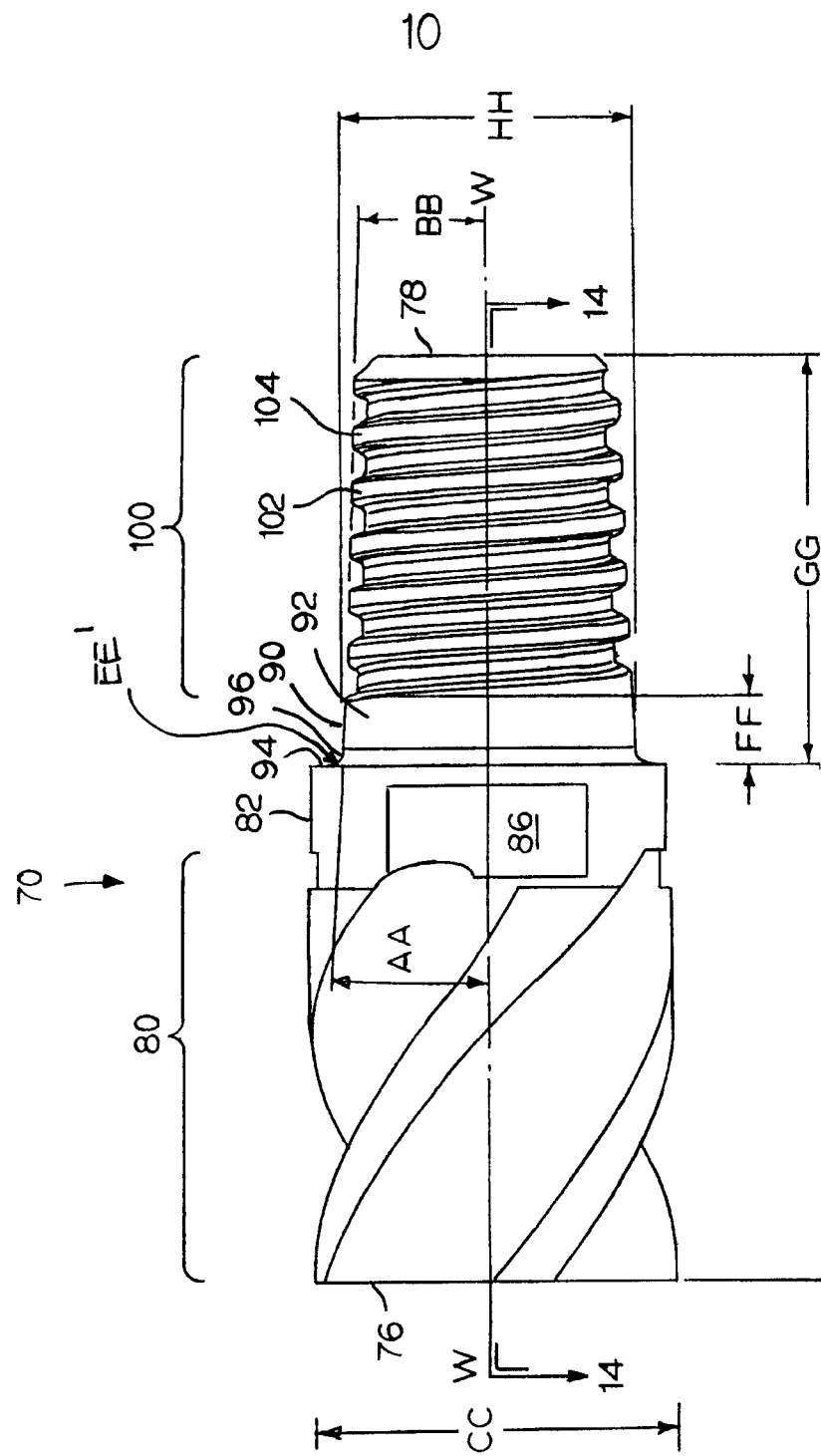
FIG. 13 is a side view of the replaceable cutter member.
Figure 14:
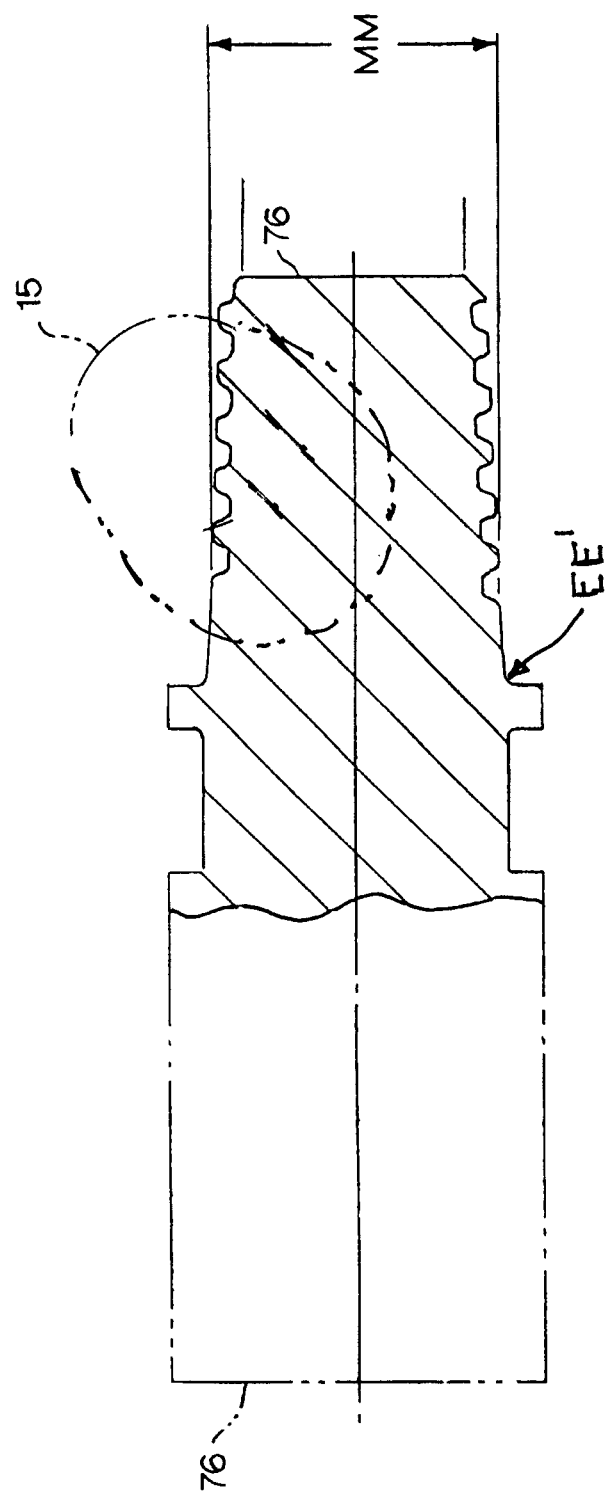
FIG. 14 is a cross-sectional view of the replaceable cutter member taken along section line 14-14 of FIG. 13.
Figure 15:
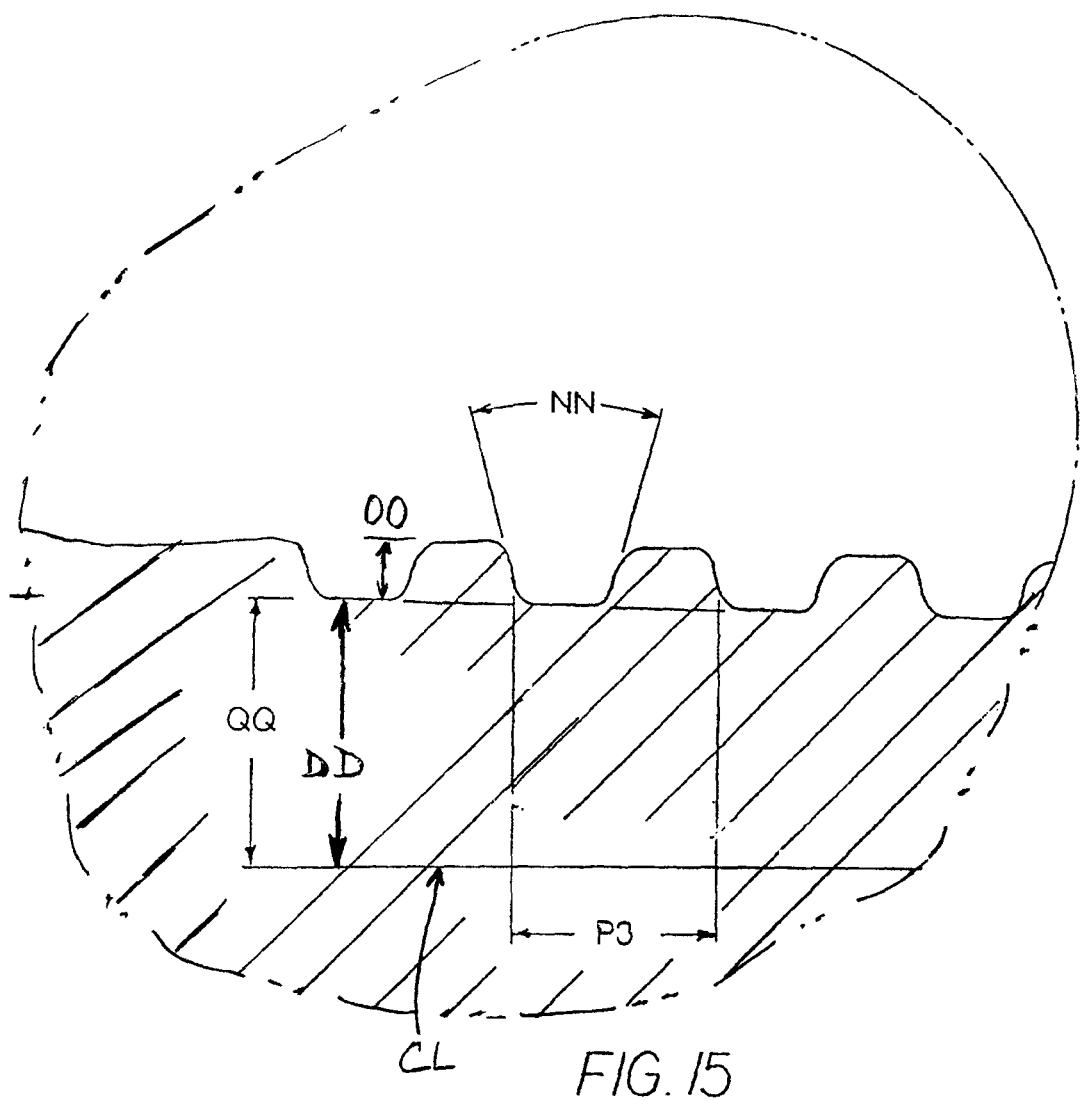
FIG. 15 is an enlarged view of the replaceable cutter member encompassed by the circle designated as 1 in FIG. 14.

FIGS. 8 through 15 show another specific embodiment of a rotary cutting tool wherein the modular rotary cutting tool comprises the basic components of a replaceable cutter member generally designated as 70 (see FIG. 13) and a reusable shank member generally designated as 72 (see FIG. 8). The cutter member 70 has an axial forward end 76 and an opposite axial rearward end 78. The axial length of the cutter member 70 is dimension "DD". The minimum diameter of the cutter member is at the axial rearward end 78 and is dimension "LL". The cutter member 70 has a central longitudinal axis W-W. In the specific embodiment illustrated in FIGS. 8 through 15, the replaceable cutter member 70, which is shown in more detail in FIGS. 13-15, is in the form of fluted cutter formed from a carbide material, however, it is to be appreciated that the cutter member can be, for example, without limitation, a face mill, rounded tip mill, slitting mill, drill, reamer, or any other replaceable tip for milling, drilling, reaming or other metal cutting applications, formed from carbide or other suitable material or materials may be employed without varying from the scope of the present invention.

Shank member 72 has an elongate geometry and has an axial forward end 110 and an axial rearward end 112. Shank member 72 has an axial length "RR" and a diameter "SS". Shank member 72 may be formed from steel, carbide or other suitable material formed in a generally cylindrical shape. It is to be appreciated that other cross-sections, shapes, and materials for the shank member 72 may also be employed without varying from the scope of the present invention. It is also to be appreciated that shank member 72 may be formed as a generally solid member, as shown in the illustrated embodiment of FIGS. 8-12. As an alternative, the shank member 72 may contain one or more internal passages through which a flow of coolant and/or lubricant travels thereby providing coolant and/or lubricant to cutter member 70 including the vicinity of where the cutter member engages the workpiece.

When the cutter member 70 is installed in (or threadedly connected to) the shank member 72, a portion of the cutter member 70 is exposed outside of the shank member 72. The exposed portion of the cutter member 70 is structured to perform a cutting (or material removal) operation on a workpiece (not illustrated). In the specific embodiment, the exposed portion of the cutter member 70 comprises a fluted cutting region (see bracket 80), which is at the axial forward end 76 of the cutter member 70, The maximum diameter of the fluted cutting region 80 is dimension "CC". The exposed portion of the cutter member 70 further includes a short cylindrical section 82, which is axially rearward of the fluted cutting region 80. The short cylindrical section 82 has a pair of opposed flats 86 (only one visible in FIG. 13) formed thereon. The flat 86 has an axial length "II". A standard spanner wrench (not shown) may engage the opposed flats 86 for installing or removing the cutter member 70 from the shank member 72.

Referring to FIGS. 8-15, these drawings illustrate details of the shank member 72 and cutter member 70 that includes the coupling mechanism between cutter member 70 and shank member 72. More particularly, as shown in FIGS. 13-15, the coupling mechanism includes, as part of cutter member 70, an elongate male threaded portion (see bracket 100 in FIG. 13) that is adjacent to the axial rearward end 78 of the cutter member 70. The male threaded portion 100 extends in an axial forward direction from the axial rearward end 78 of the cutter member 70.

The coupling mechanism further includes an axial forward radial aligner portion 90 that is disposed concentric to the central longitudinal axis W-W and which extends in the axial forward direction from the male threaded portion 100. An arcuate fillet 96 joins the axial forward radial aligner portion 90 with a flat axial stop shoulder 94 wherein the fillet 96 and the flat axial stop shoulder 94 together bridge the radial gap between the axial forward radial aligner portion 90, which has a smaller diameter relative to the larger diameter short cylindrical portion 82. As shown in the drawings, dimension EE is the axial length of the arcuate fillet 96.

The arcuate fillet 96 has a radius EE' (see FIGS. 13 and 14). The ratio of the fillet (96) radius EE' to the diameter CC of the cutter member 70 can range between about 0.02 and about 0.04 wherein a preferred EE'/CC ratio can be 0.025 and 0.035. It is critical to provide a fillet 96 with a radius EE' that falls within the above range for the EE'/CC ratio of about 0.02 and about 0.04. By keeping the EE'/CC ratio within this range, the amount of face contact between the flat axial stop shoulder 94 and the axial stop shoulder 126 is sufficient to maintain satisfactory stiffness and accuracy and also maintain lower stresses at the point of the arcuate fillet 96. In other words, keeping the EE'/CC ratio within this range balances the amount of face contact (between the flat axial stop shoulder 94 and the axial stop shoulder 126) and the size of the radius EE' of the arcuate fillet 96 to reduce stress at the location of the fillet 96.

Dimension FF is the axial length from the axial flat stop shoulder to the axial rear end of the axial forward radial aligner portion. It is beneficial to maintain the distance FF to be as great as practical because the greater the distance FF, the greater amount of torque is necessary to tighten the cutter member 70 to the shank member 72. The greater the dimension FF, the less the distortion of the threads during use. It has been found that the preferred minimum ratio of the dimension FF to the diameter CC of the cutter member 70 is about 0.18. Although the FF/CC ratio can range between about 0.15 and about 0.25. Dimension GG is the axial length between the axial flat stop shoulder and the rear end of the cutter member. Dimension HH is the maximum diameter of the axial forward radial aligner portion, which is at the axial forward end thereof. Dimension JJ is the axial length of the flat on the short cylindrical section.

As shown in FIG. 13, flat axial stop shoulder 94 may be disposed perpendicular to the longitudinal axis W-W. In other embodiments, flat axial stop shoulder 94 may be slightly inclined (up to +/−3°) to a reference drawn perpendicular to the longitudinal axis W-W. The extent or degree of the inclination can depend upon the specific application for the modular rotary cutting tool.

Referring to FIG. 13, the axial forward radial aligner portion 90 is formed generally as a portion of a truncated cone and includes an outward facing circumferential surface 92 disposed at an angle AA (see FIG. 13) relative to central longitudinal axis W-W of the cutter member 70. While specific values of angle AA are set forth herein in Table 1, in exemplary embodiments of the present invention, the angle AA is generally in the range of about 1° to about 7°. Alternatively, axial forward radial aligner portion 90 may be of a generally cylindrical shape (i.e., AA is equal to zero degrees (0°). In general, a truncated cone has been found to be preferable when the cutter member 70 is coupled with steel shanks while the cylindrical shape has been found to be preferable when the cutter member 70 is coupled with carbide shanks. There should be an appreciation that this preference may not always be applicable in certain specific applications.

Referring to FIGS. 13-15, elongate male threaded portion 100, which has a maximum diameter "MM", of cutter member 70 includes a plurality of male threads (102, 104), preferably at least five male threads (although a greater number of male threads may be employed). The male threads (102, 104) are disposed at a third pitch P3 about longitudinal axis W-W. As shown in FIGS. 13-15, the male threads have a depth OO (see FIG. 15) and have side walls of adjacent threads (102, 104) disposed at angle NN relative to each other. The male threaded portion 100 has an orientation such that the distal surfaces of the male threads (102, 104) are disposed at angle BB relative to the central longitudinal axis W-W of the cutter member 70, and the roots of the male threads (102, 104) are disposed relative to the central longitudinal axis W-W of the cutter member 70 at the angle "QQ". The maximum radial distance from the root of the axial forwardmost male thread to the centerline (CL in FIG. 15) of the threaded portion is dimension DD. Specific values of these dimensions are set forth in Table 1.

It is advantageous to provide for the axial forwardmost male thread (see 201A in FIG. 13) to have a minor diameter, which is the maximum minor diameter for the male threaded portion, that is between about 60% and about 70% of the maximum diameter (CC) of the cutter member 70. A narrower range for the value of the maximum minor diameter of the male threaded portion is between about 65% and about 70% of maximum diameter (CC) of the cutter member 70.

The coupling mechanism also includes, as part of shank member 72, a shank bore 114 that has a mouth at the axial forward end thereof. The maximum diameter of the mouth is "WW". The shank bore 114 includes an axial forwardmost shank bore portion 116, which is generally smooth, disposed concentric to longitudinal axis X-X, and has a maximum diameter "VV". The axial forwardmost shank bore portion 116 has an inward facing circumferential surface 118. The axial forwardmost shank bore portion 116 is disposed relative to the central longitudinal axis W-W of the cutter member 70 at an angle "TT".

There is a second axial forward shank bore portion 122, which is generally smooth, that has an inwardly facing circumferential surface 124. The second axial forward shank bore portion 22 is axially rearward of the axial forwardmost shank bore portion 116. The second axial forward shank bore portion 122 is disposed relative to the central longitudinal axis X-X of the shank member 72 at an angle "UU". The maximum diameter of the second axial forward shank bore portion 122 is dimension "CCC". The shank member 72 further has an axial stop shoulder 126 disposed perpendicular to the longitudinal axis X-X at an end of shank member 72 adjacent the forwardmost smooth alignment bore 116. In other specific embodiments, the axial stop shoulder 126 may be slightly inclined (up to +/−3°) to a reference drawn perpendicular to the longitudinal axis X-X. The extent or degree of the inclination can depend upon the specific application for the modular rotary cutting tool. Dimension XX is the axial length between the axial forward end of the shank member and the rear end of the axial forwardmost shank bore portion. Dimension YY is the axial length between the axial forward end of the shank member and the rear end of the second axial forward shank bore portion.

The shank bore 114 further includes a female threaded bore portion 130 extending a dimension "ZZ" in an axial rearward direction from the second forward alignment bore 122. The female threaded bore portion 130 includes a number of female threads (132, 134) corresponding to the number of male threads (102, 104) and the female threads (132, 134) disposed about longitudinal axis X-X at a fourth pitch P4, which is different than the third pitch P3. Specific values of the fourth pitch P4 are set forth in Table 1 herein. Dimension EEE is angle at which the opposed surfaces of adjacent female threads are disposed relative to each other, and dimension FFF is the depth of the female threads. Dimension GGG is the angle at which the roots of the female threads are disposed relative to the central longitudinal axis X-X of the shank member. Dimension III is the starting radius of the female threaded portion.

Referring to the cross-sectional detail view of an end portion of shank member 72 shown in FIG. 12, the axial forwardmost shank bore portion 116 is formed in a generally corresponding shape to forward radial aligner portion 90 of the cutter member 70. Preferably, the diameter of the forward radial aligner portion 90 is slightly larger than the diameter of the axial forwardmost shank bore portion 116. This difference in dimension between the diameters of the forward radial aligner portion 90 and the axial forwardmost shank bore portion 116 provides an interference fit between the cutter member 70 and the shank member 72. The greater the extent of this interference fit, the greater the extent of stiffness, but too great of an interference fit will result in a reduction in the face contact between the flat axial stop shoulder 94 and the axial stop shoulder 126 due to a distortion of the angular disposition of these shoulders, i.e., the flat axial stop shoulder 94 and the axial stop shoulder 126. The extent of this interference fit (i.e., difference in diameters of the forward radial aligner portion 90 and the axial forwardmost shank bore portion 116) can be termed "stand off", and the "stand off" can range between about 0.015 and about 0.035 of the maximum diameter (CC) of the cutter member 70 with one preferable value of the "stand off" being equal to about 0.025 the maximum diameter (CC) of the cutter member 70. The "stand off" will close when the tool tightens due to the elastic deformation of the shank member. However, the dimensional relationship between the diameter of the forward radial aligner portion 90 and the diameter of the axial forwardmost shank bore portion 116 may vary depending upon the specific application for the rotary cutting tool.

The shank bore 114 further contains an axial rearward shank bore portion 140 that has an axial length "AAA" and a diameter "BBB". The axial rearward shank bore portion 140 has a rearward shank bore wall 144. The axial rearward shank bore portion 140 has a maximum diameter BBB. The shank bore 114, as well as the axial rearward shank bore portion 140, terminates at a terminal end 146. The angle at which the surface defining the axial rearward shank bore portion 140 is disposed relative to the central longitudinal axis X-X of the shank member 72 at an angle "DDD".

In the specific embodiment shown in FIGS. 8-15, as will be seen by the values in Table 1, the fourth pitch P4 is greater than the third pitch P3. By utilizing a larger fourth pitch P4 in the female threaded bore portion 130 of the shank member 72, and thus a smaller third pitch P3 in cutter member 70, the resulting stress on male threaded portion 100 of cutter member 70 when coupled with shank member 72 is dispersed more evenly among the male threads (102, 104) as compared to an embodiment in which cooperating threads of generally the same pitch are utilized. In exemplary embodiments of the present invention, thread pitches varying from about 0.002 mm to about 0.010 mm between the respective threads of the shank member 72 and cutter member 70 have been employed. However, for cutter members with a diameter CC equal to 12 mm or 16 mm, one preferable difference in the pitch between the male threads and the female threads in the range of 0.003 mm and 0.005 mm (i.e., 3 to 5 microns). Typically, the difference resides in the pitch of the female threads being greater than the pitch of the male threads. In a specific embodiment of a 12 mm diameter cutter member, the pitch of the male threads is equal to 1.755 mm and the pitch of the female threads in the corresponding shank bore of the shank member is equal to 1.760 mm. In the specific embodiment of a 16 mm diameter cutter member, the pitch of the male threads is equal to 2.345 mm and the pitch of the female threads in the corresponding shank bore of the shank member is equal to 2.35 mm. In contrast to embodiments of the present invention, in instances where cooperating threads of generally the same pitch are utilized, stress is generally concentrated at the thread closest to flat axial stop shoulder due to the general inelasticity of the carbide or steel cutter. By more evenly distributing the stress among the threads (102, 104) of male threaded portion 100, specific embodiments of the present invention allow for higher loads to be applied to the connection before failure.

Assembly of the modular cutting tool assembly is performed by engaging the male threaded portion 100 of cutter member 70 with the female threaded bore 130 of the shank member 72 and subsequently rotating one or both of the cutter member 70 and/or shank member 72 until the forward radial aligner portion 90 of cutter member 70 is seated within the axial forwardmost shank bore portion 116 of shank member 72 and the axial stop shoulder 94 of the cutter member 70 abuts the axial stop shoulder 126 of the shank member 72. The axial position of cutter member 70 with respect to shank member 72 is derived from the direct contact of stop shoulder 94 of cutter member 70 with the axial stop surface 126 of shank member 72. Once stop shoulder 94 and stop surface 126 are engaged, the coupling is preferably further tightened to a specified torque using a torque limiting wrench to avoid excessive tension of the cutter member 70. In this position, the rear end 70 of the cutter member 70 is spaced apart from the terminal end 146 of the shank bore 114.

The Table 1 sets forth the dimensional relationships of certain structural features of specific embodiments wherein one specific embodiment has a cutting diameter equal to 12 mm and the other specific embodiment has a cutting diameter equal to 16 mm. The length dimensions are set forth as a ratio of the specific dimension to the maximum diameter of the fluted cutter portion of the cutter member taken at the axial forward end of the cutter member, which is dimension CC in Table 1. The angular dimensions are set forth as angles.

TABLE 1

Dimensions for Specific Embodiments of the Cutter Member and the Shank Member

| Designation | Description of the Designation/Dimension | For Length Dimensions, the range of the Ratio of the Dimension Relative to the Cutting Diameter (CC) of the Cutter Member |
|---|---|---|
| AA | Half angle at which the surface of the axial forward radial aligner portion is disposed relative to the central longitudinal axis W-W of the cutter member | 2° to 4° and wherein AA is greater than or equal to BB |
| BB | Half angle at which the distal surfaces of the male threads of the male threaded portion are disposed relative to the central longitudinal axis W-W of the cutter member | 1° to 3° |
| CC | Maximum diameter of the fluted cutter portion of the cutter member taken at the axial forward end of the cutter member (or cutting diameter) | 1.0 |
| DD | Maximum radial distance from the thread root to the centerline of the threaded portion | Ratio of DD/CC ranges between 0.30 to 0.35 |
| EE' | Radius of the arcuate fillet | Ratio of EE'/CC ranges between 0.025 to 0.035 |
| FF | Axial length from the axial flat stop shoulder to the axial rear end of the axial forward radial aligner portion | Ratio of FF/CC ranges between 0.15 to 0.25 |
| GG | Axial length between the axial flat stop shoulder and the rear end of the cutter member | Ratio of GG/CC ranges between 0.9 to 1.3 |
| HH | Maximum diameter of the axial forward radial aligner portion, which is at the axial forward end thereof | Ratio of HH/CC ranges between 0.75 to 0.85 |
| MM | Maximum diameter of the male threaded portion at the axial forward end of the male threaded portion | Ratio of MM/CC ranges between 0.72 to 0.82 |
| NN | Angle of disposition between surfaces of adjacent male threads in the male threaded portion | 20° to 40° |
| OO | Depth of the male threads | Ratio of OO/CC ranges between 0.03 to 0.06 |
| P3 | Pitch of the males threads | Ratio of P3/CC ranges between 0.12 to 0.18 |
| QQ | Half angle at which the roots of the male threads of the male threaded portion are disposed relative to the central longitudinal axis W-W of the cutter member | 1° to 3° |
| TT | Half angle at which the axial forwardmost cylindrical bore portion is disposed relative to the central longitudinal axis X-X of the shank member | 2° to 4° |
| UU | Half angle at which the second axial forward cylindrical bore portion is disposed relative to the central longitudinal axis X-X of the shank member | 1° to 3° |
| VV | Maximum diameter of the axial forwardmost cylindrical bore section | Ratio of VV/CC ranges between 0.75 to 0.85 |
| WW | Maximum diameter of the mouth of the shank bore at the axial forward end of the shank bore | Ratio of WW/CC ranges between 0.80 to 0.90 |
| XX | Axial length between the axial forward end of the shank member and the rear end of the axial forwardmost cylindrical bore section | Ratio of XX/CC ranges between 0.15 to 0.25 |
| YY | Axial length between the axial forward end of the shank member and the rear end of the second axial forward cylindrical bore section | Ratio of YY/CC ranges between 0.2 to 0.3 |
| ZZ | Axial length between the axial forward end of the shank member and the rear end of the shank bore | Greater than the value for GG |

TABLE 1-continued

Dimensions for Specific Embodiments of
the Cutter Member and the Shank Member

| Designation | Description of the Designation/Dimension | For Length Dimensions, the range of the Ratio of the Dimension Relative to the Cutting Diameter (CC) of the Cutter Member |
|---|---|---|
| AAA | Axial length of the axial rearward cylindrical bore | Ratio of AAA/CC ranges between 0.1 to 0.3 |
| BBB | Diameter of the axial rearward cylindrical bore | Ratio of BBB/CC ranges between 0.50 to 0.75 |
| CCC | Maximum diameter of the second axial forward cylindrical bore section | Ratio of CCC/CC ranges between 0.75 to 0.85 |
| DDD | Half angle at which the surface defining the axial rearward cylindrical bore is disposed relative to the central longitudinal axis X-X of the shank member | 1° to 3° |
| EEE | Angle at which the opposed surfaces of adjacent female threads are disposed relative to each other | 20° to 40° |
| FFF | Depth of the females threads | Ratio of FFF/CC ranges between 0.03 to 0.06 |
| GGG | Half angle at which the roots of the female threads are disposed relative to the central longitudinal axis X-X of the shank member | 1° to 3° |
| III | Starting radius of the female threaded portion | Ratio of III/CC ranges between 0.37 to 0.43 |
| P4 | Pitch of the female threads | Ratio of P4/CC ranges between 0.12 to 0.18 |

Figure 16:
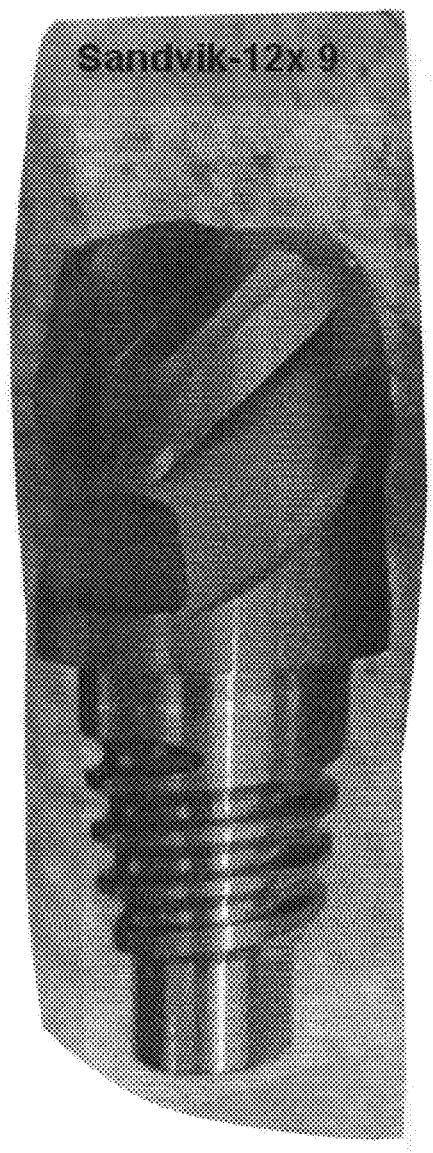
FIG. 16 is photograph of a competitive cutter member made by Sandvik.
Figure 17:
FIG. 17 is photograph of a competitive cutter member made by Iscar.
Figure 18:
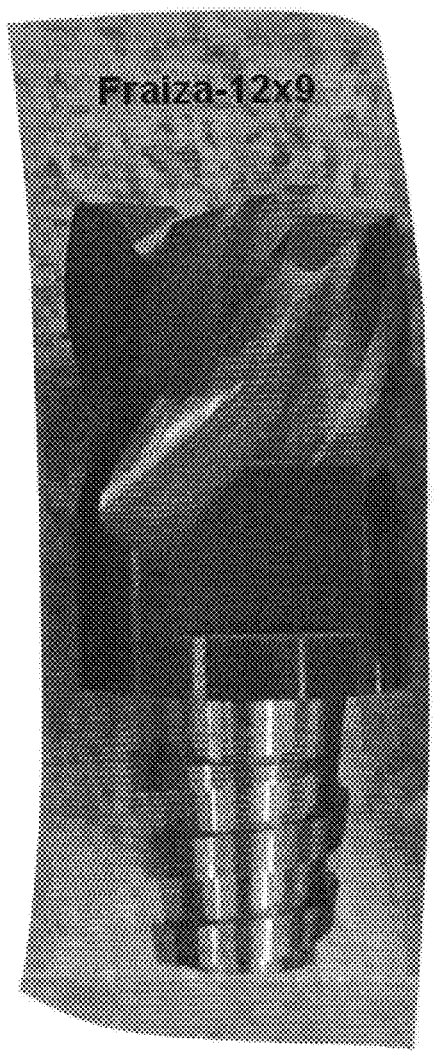
FIG. 18 is photograph of a competitive cutter member made by Fraiza.

Exemplary competitive cutter members are shown in FIGS. 16, 17 and 18. FIG. 16 is cutter made by Sandvik. FIG. 17 is a cutter member made by Iscar. FIG. 18 is a cutter member made by Fraiza. It is apparent that these competitors' cutter members have a different geometry than the specific embodiment herein.

Figure 19:
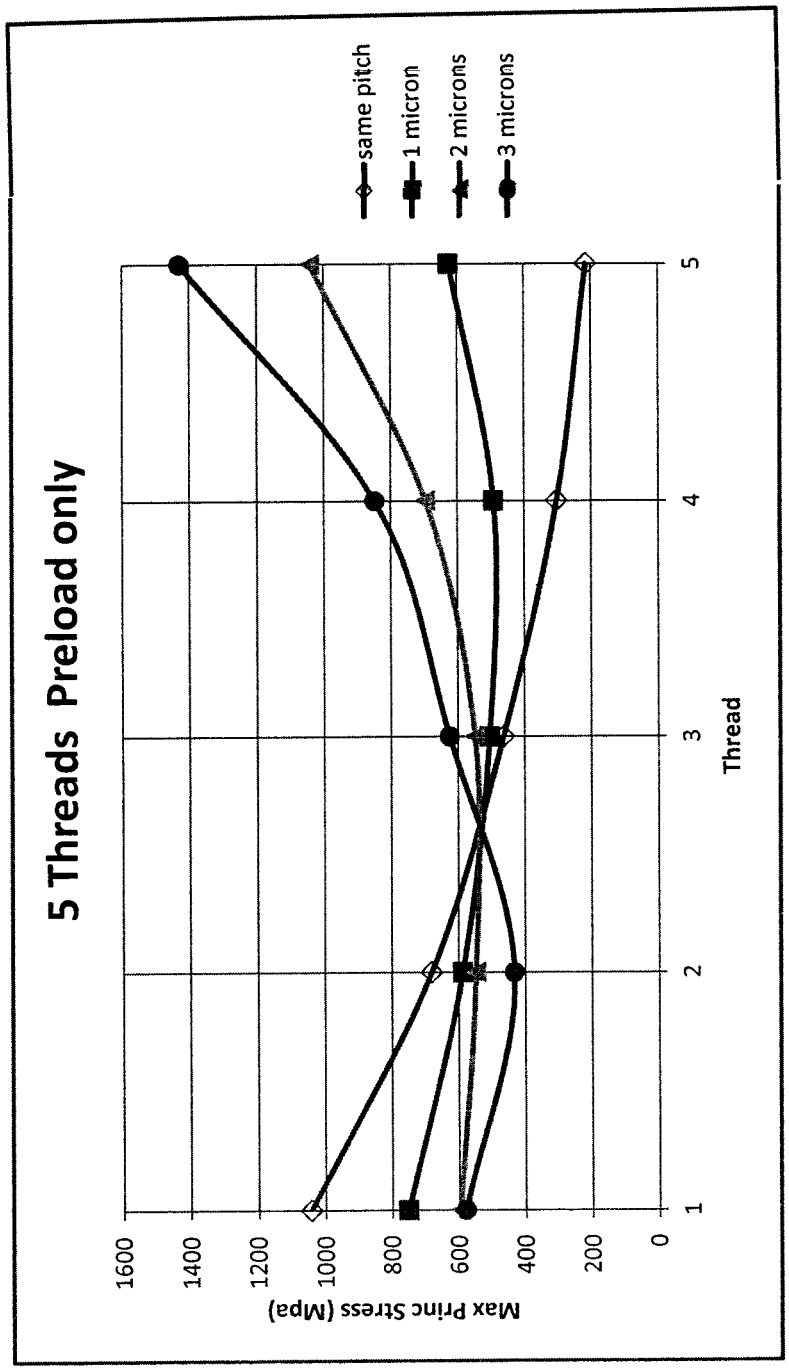
FIG. 19 is graph showing results of a computer simulation wherein the maximum principle stress (MPa) under preload at each of five different threads of four different cutter members as described in more detail hereinafter wherein thread 1 is the thread closest to the cutting region of the cutter member and thread 5 is closest to the rear end (or tail) of the cutter member.

FIG. 19 is graph based upon results from a computer simulation showing the maximum principle stress (MPa) under preload at each of five different threads of four different cutter members wherein thread 1 is the thread closest to the cutting region of the cutter member and thread 5 is closest to the rear end (or tail) of the cutter member. The cutter member represented by the hollow circle and designated in the legend as "same pitch" has five threads and the pitch of the female threads of the shank member is equal to the pitch of the male threads of the cutter member. The cutter assembly represented by the solid square and designated in the legend as "1 micron" has five threads and the pitch of the female threads is 1 micron greater than the pitch of the male threads. The cutter assembly represented by the solid triangle and designated in the legend as "2 microns" has five threads and the pitch of the female threads is 2 microns greater than the pitch of the male threads. The cutter member represented by the solid circle and designated in the legend as "3 microns" has five threads and the pitch of the female threads is 3 microns greater than the pitch of the male threads. The threads 1 through 5 designate the threads of the cutter member wherein thread 1 is the thread closest to the cutting region and thread 5 is closest to the rear end (or tail) of the cutter member.

Still referring to FIG. 19, as can be seen, the lower maximum principle stress values at thread Tare for the cutter members in which the pitch of the female threads is greater than the male threads, i.e., a difference of 2 microns and 3 microns. The maximum principle stress at thread 1 is higher for the cutter member in which the pitch of the female threads is 1 micron greater than the pitch of the male threads. The maximum principle stress is greatest for the cutter member in which the pitch of the female threads is the same as the pitch for the male threads. Lower maximum principle stress values are preferred and especially at thread 1 which is the location most susceptible to breakage. There is not as great a concern about the maximum principle stress value at thread 5.

Figure 20:
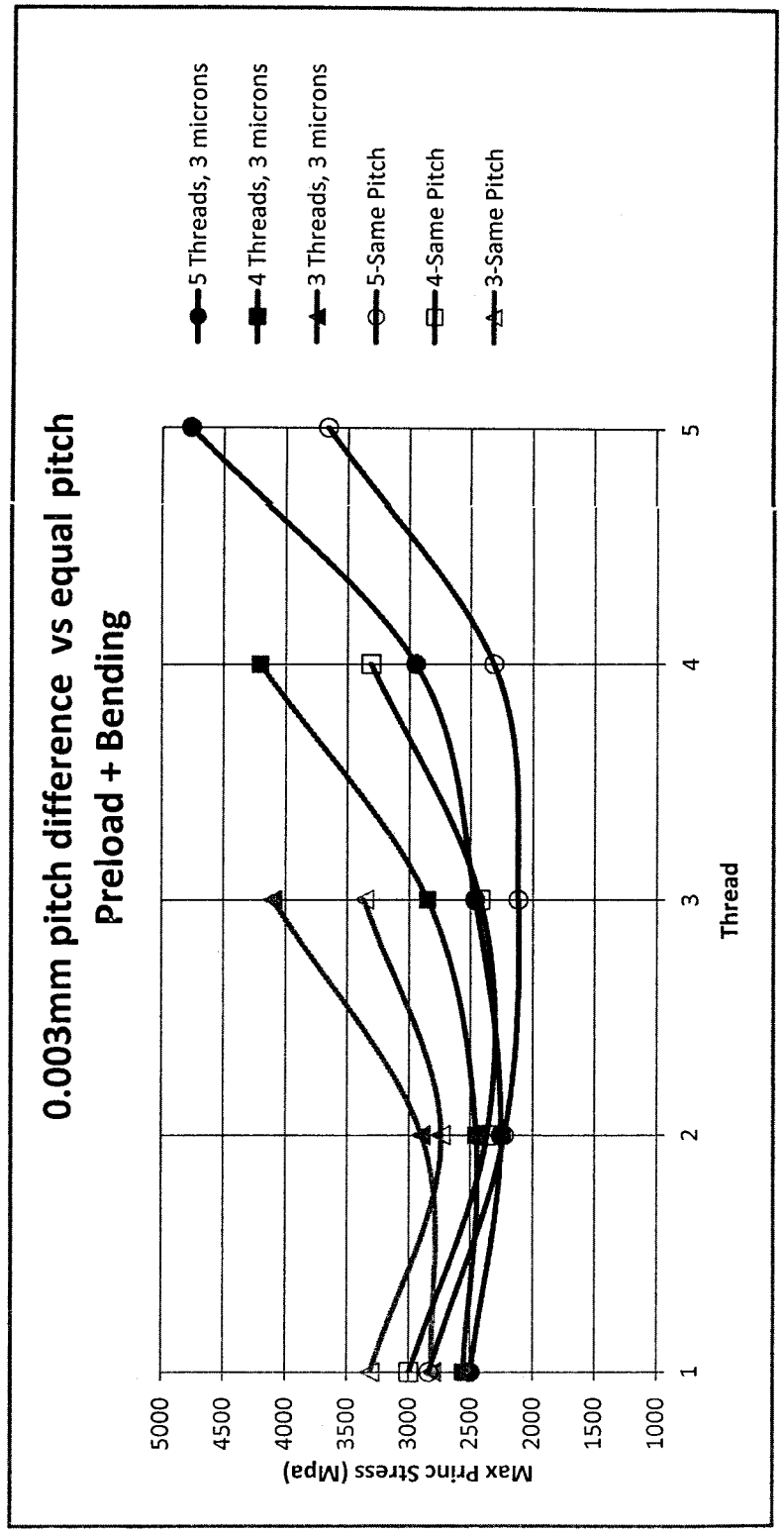
FIG. 20 is graph showing results of a computer simulation wherein the maximum principle stress (MPa) under preload and bending at each of five different threads, if applicable, of six different cutter members as described in more detail hereinafter wherein thread 1 is the thread closest to the cutting region of the cutter member and thread 5 is closest to the rear end (or tail) of the cutter member.

FIG. 20 is graph based upon results from a computer simulation showing the maximum principle stress (MPa) under preload and bending at each of five different threads, if applicable, of six different cutter members as described below wherein thread 1 is the thread closest to the cutting region of the cutter member and thread 5 is closest to the rear end (or tail) of the cutter member. As will become apparent, each cutter assembly has a different number of threads and a different pitch condition, i.e., the difference in pitch between the female threads of the shank member and the male threads of the cutter member.

The solid circle (designated as "5 threads, 3 microns") represents a cutter member with five threads and the pitch of the female threads is 3 microns greater than the pitch of the male threads. The solid square (designated as "4 threads, 3 microns") represents a cutter member with four threads and the pitch of the female threads is 3 microns greater than the pitch of the male threads. The solid triangle (designated as "3 threads, 3 microns") represents a cutter member with three threads and the pitch of the female threads is 3 microns greater than the pitch of the male threads. The open circle (designated as "5 same pitch") represents a cutter member with five threads and the pitch of the female threads is the same as the pitch of the male threads. The open square (designated as "4 same pitch") represents a cutter member with four threads and the pitch of the female threads is the same as the pitch of the male threads. The open triangle (designated as "3 same pitch") represents a cutter member with three threads and the pitch of the female threads is the same as the pitch of the male threads.

Still referring to FIG. 20, as can be seen, the lower maximum principle stress values at thread 1 are for the cutter members in which the pitch of the female threads is greater than the pitch of the male threads, i.e., a difference of 3 microns. The maximum principle stress is greatest for the cutter member in which the pitch of the female threads is the same as the pitch for the male threads. Lower maximum principle stress values are preferred and especially at thread 1 which is the location most susceptible to breakage. There is not as great a concern about the maximum principle stress value at thread 5.

Although in the particular embodiments described herein the shank is provided with a threaded bore for engaging a complementary male thread on the cutter, the reverse is also possible whereby the shank is provided with a protruding male threaded portion, and the cutter is provided with an internally threaded bore.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be tip embraced therein.

What is claimed is:

1. A rotary cutting tool comprising:
    a cutter member having an axial forward end and an axial rearward end, a cutting region at the axial forward end of the cutter member, and a male threaded portion adjacent the axial rearward end of the cutter member;
    a shank member having an axial forward end and a shank bore opening at the axial forward end, the shank bore having an axial shank bore length, the shank bore containing a female threaded portion and an axial rearward shank bore portion axially rearward of the female threaded portion, and the axial rearward shank bore portion having a terminal end;
    the male threaded portion including a number of threads disposed at a first pitch and the female threaded portion including a number of threads disposed at a second pitch different than the first pitch;
    the male threaded portion including a thread closest to the axial forward end;
    wherein the cutter includes an axial stop shoulder and the shank member includes an axial stop surface; and
    in an assembled state:
        the cutter member and the shank member are selectively coupled via threaded engagement of the male threaded portion and the female threaded portion, wherein the male threaded portion of the cutter member fully engages the female threaded portion of the shank member;
        the axial stop shoulder of the cutter abuts the axial stop surface of the shank member; and
        the axial rearward end of the cutter member is spaced at a first distance axially forward of the terminal end of the axial rearward shank bore portion;
        whereby stress concentration at the thread closest to the axial forward end of the cutter member is avoided.

2. The rotary cutting tool according to claim 1, wherein the cutter member comprises:
    an axial forward radial aligner portion axially forward of the male threaded portion;
    wherein the axial stop shoulder is disposed axially forward of the axial forward radial aligner portion; and
    an arcuate fillet joining the axial forward radial aligner portion and the axial stop shoulder;
    the arcuate fillet having a radius wherein the ratio of the radius of the arcuate fillet to a maximum diameter of the cutting region ranges between about 0.02 and about 0.04.

3. The rotary cutting tool according to claim 2 wherein the ratio of the radius of the arcuate fillet to the maximum diameter of the cutting region ranges between about 0.025 and about 0.035.

4. The rotary cutting tool according to claim 2 wherein the axial forward radial aligner portion has an axial rear end, the axial stop shoulder is disposed at a distance from the axial rear end of the axial forward radial aligner portion, and the ratio of the distance to the maximum diameter of the cutting region ranges between about 0.15 to about 0.25.

5. The rotary cutting tool according to claim 4 wherein the ratio of the distance to the maximum diameter of the cutting region is greater than or equal to 0.18.

6. The rotary cutting tool according to claim 2 wherein the axial stop shoulder is disposed at an angle between about −3 degrees and about +3 degrees relative to a reference line perpendicular to a central longitudinal axis of the cutter member.

7. The rotary cutting tool according to claim 1 wherein an axial forward radial aligner portion has an outward facing circumferential surface disposed at an angle relative to a central longitudinal axis of the cutter member, and the angle ranges between about 1 degree and about 7 degrees.

8. The rotary cutting tool according to claim 7 wherein:
    each of the male threads has a depth, a root and a distal surface; the distal surfaces of the male threads being disposed at an angle relative to the central longitudinal axis of the cutter member, which angle ranges between about 1 degree and about 3 degrees; the roots of the male threads being disposed at an angle relative to the central longitudinal axis of the cutter member, which angle ranges between about 1 degree and about 3 degrees; wherein the ratio of the male thread depth to a maximum diameter of the cutting region ranges between about 0.03 and about 0.06; and
    wherein the angle at which the outward facing circumferential surface is disposed relative to the central longitudinal axis of the cutter member is greater than or equal to the angle at which the distal surfaces of the male threads are disposed relative to the central longitudinal axis of the cutter member.

9. The rotary cutting tool according to claim 8 wherein the angle at which outward facing circumferential surface is relative to the central longitudinal axis of the cutter member is greater than the angle at which the distal surfaces of the male threads are disposed relative to the central longitudinal axis of the cutter member.

10. The rotary cutting tool according to claim 1 wherein the male threaded portion has a maximum radial distance from thread root to a centerline, and the ratio of the maximum radial distance from the thread root to the centerline to a maximum diameter of the cutting region ranges between about 0.30 and about 0.35.

11. The rotary cutting according to claim 1 wherein a difference between a maximum diameter of an axial forward radial aligner portion and the maximum diameter of the axial forwardmost shank bore portion ranges between about 0.015 and about 0.035 of the maximum diameter of the cutting region.

12. The rotary cutting tool according to claim 11 wherein the difference between a maximum diameter of the axial forward radial aligner portion and the maximum diameter of the axial forwardmost shank bore portion is about 0.025 of the maximum diameter of the cutting region.

13. The rotary cutting tool according to claim 1 wherein the male threaded portion comprises at least five male threads.

14. The rotary cutting tool according to claim 1 wherein the female thread pitch is greater than the male thread pitch.

15. The rotary cutting tool according to claim 14 wherein the ratio of the male thread pitch to a maximum diameter of the cutting region is between about 0.12 and about 0.18, and the ratio of the female thread pitch to the maximum diameter of the cutting region is between about 0.12 and about 0.18.

16. The rotary cutting tool according to claim 1, wherein: the shank bore has a length, the cutter member has a flat axial stop shoulder, and a distance is defined between the axial stop shoulder and the axial rearward end of the cutter member; the length of the shank bore being greater than the distance between the axial stop shoulder and the axial rearward end of the cutter member; the ratio of the distance between the axial stop shoulder and the axial rearward end of the cutter member to a maximum diameter of the cutting region is between about 0.9 and about 1.3.

17. A cutter member for use in conjunction with a shank member wherein the shank member has an axial forward end and a shank bore opening at the axial forward end, the shank bore having an axial shank bore length, the shank bore containing a female threaded portion and an axial rearward shank bore portion axially rearward of the female threaded portion, the shank member further including an axial stop surface, and the axial rearward shank bore portion having a terminal end, the cutter member comprising:

an axial forward end and an axial rearward end, a cutting region at the axial forward end of the cutter member, and a male threaded portion adjacent the axial rearward end of the cutter member;

an axial forward radial aligner portion axially forward of the male threaded portion, and a flat axial stop shoulder axially forward of the axial forward radial aligner portion, and an arcuate fillet joining the axial forward radial aligner portion and the flat axial stop shoulder, and the arcuate fillet having a radius wherein the ratio of the radius of the arcuate fillet to the maximum diameter of the cutting region ranges between about 0.02 and about 0.04;

the male threaded portion including a number of threads disposed at a first pitch and the female threaded portion including a number of threads disposed at a second pitch different than the first pitch;

the male threaded portion including a thread closest to the axial forward end;

wherein the cutter includes an axial stop shoulder; and in an assembled state:

the cutter member and the shank member are selectively coupled via threaded engagement of the male threaded portion and the female threaded portion, wherein the male threaded portion of the cutter member fully engages the female threaded portion of the shank member;

the axial stop shoulder of the cutter abuts the axial stop surface of the shank member; and the axial rearward end of the cutter member is spaced at a first distance axially forward of the terminal end of the axial rearward shank bore portion;

whereby stress concentration at the thread closest to the axial forward end of the cutter member is avoided.

18. The cutter member according to claim 17 wherein the ratio of the radius of the arcuate fillet to the maximum diameter of the cutting region ranges between about 0.025 and about 0.035.

19. The cutter member according to claim 18 wherein when the male threaded portion of the cutter member fully engages the female threaded portion of the shank member, the axial rearward end of the cutter member being spaced a first distance axially forward of the terminal end of the axial rearward shank bore portion.

20. The rotary cutting tool of claim 1 wherein the cutter member is formed from a carbide material and wherein the shank member is formed from a tool steel.

* * * * *